(12) United States Patent
Brown et al.

(10) Patent No.: US 8,851,380 B2
(45) Date of Patent: Oct. 7, 2014

(54) DEVICE IDENTIFICATION AND MONITORING SYSTEM AND METHOD

(75) Inventors: Stephen J. Brown, Woodside, CA (US); Andreas Schobel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/349,901

(22) Filed: Jan. 13, 2012

(65) Prior Publication Data

US 2012/0117232 A1 May 10, 2012

Related U.S. Application Data

(63) Continuation-in-part of application No. 12/381,594, filed on Mar. 13, 2009, now Pat. No. 8,096,477, which is a continuation-in-part of application No. 12/322,046, filed on Jan. 27, 2009, now Pat. No. 8,200,757.

(60) Provisional application No. 61/461,097, filed on Jan. 13, 2011.

(51) Int. Cl.
*G06K 7/10* (2006.01)
*G06Q 10/10* (2012.01)

(52) U.S. Cl.
CPC .................................... *G06Q 10/10* (2013.01)
USPC .................. 235/462.09; 235/375; 235/472.03

(58) Field of Classification Search
CPC .......... G06K 9/00852; G06K 9/00872; G06K 9/00469
USPC ............. 235/462.01–462.45, 472.01–472.03, 235/454, 375
See application file for complete search history.

(56) References Cited

U.S. PATENT DOCUMENTS

| | | | |
|---|---|---|---|
| 6,192,165 B1 | 2/2001 | Irons et al. | |
| 7,308,254 B1 | 12/2007 | Rissanen | |
| 7,499,567 B2 | 3/2009 | Shimosato et al. | |
| 8,078,450 B2* | 12/2011 | Anisimovich et al. | 704/9 |
| 2005/0108686 A1 | 5/2005 | White | |
| 2006/0206564 A1 | 9/2006 | Burns et al. | |
| 2007/0118802 A1 | 5/2007 | Gerace et al. | |
| 2007/0245304 A1 | 10/2007 | Curran | |
| 2007/0298399 A1 | 12/2007 | Shao et al. | |
| 2008/0021976 A1 | 1/2008 | Chen et al. | |
| 2008/0034056 A1 | 2/2008 | Renger et al. | |
| 2008/0056574 A1 | 3/2008 | Heck | |
| 2009/0006547 A1 | 1/2009 | Banatwala | |
| 2012/0143597 A1* | 6/2012 | Mushtaq et al. | 704/9 |

* cited by examiner

*Primary Examiner* — Thien M Le
(74) *Attorney, Agent, or Firm* — Novak Druce Connolly Bove + Quigg LLP

(57) ABSTRACT

A method and system for collecting and recognizing information from a monitoring device is provided. On a mobile computer device a user can capture an image of a monitoring device. The image captures at least two aspects: (1) monitored data tracked or acquired by the monitoring device, and (2) a portion of the monitoring device sufficient to recognize the monitoring device. Recognition functions are provided for: (1) recognizing and converting the monitored data visible in the captured image into quantifiable data, and (2) for recognizing the monitoring device. A note taking function can be provided to allow a user to create notes. The notes can be enriched with the quantifiable data and/or the recognized monitoring device (or vice versa). A suggestion function can be provided for suggesting services where the quantifiable data, the recognized monitoring device, and/or the notes can be bound.

27 Claims, 24 Drawing Sheets

1910

DEVICE IDENTIFICATION AND MONITORING SYSTEM AND METHOD

CROSS REFERENCE TO RELATED APPLICATIONS

This application claims priority from U.S. Provisional Patent Application 61/461,097 filed Jan. 13, 2011, which is incorporated herein by reference. This application is a continuation-in-part of U.S. patent application Ser. No. 12/381, 594 filed Mar. 13, 2009, now U.S. Pat. No. 8,096,477 which is incorporated herein by reference. U.S. patent application Ser. No. 12/381,594 filed Mar. 13, 2009 is a continuation-in-part of U.S. patent application Ser. No. 12/322,046 filed Jan. 27, 2009, now U.S. Pat. No. 8,200,757 which is incorporated herein by reference.

FIELD OF THE INVENTION

The invention relates to systems and methods for device identification and monitoring systems, especially for sports and health monitoring.

BACKGROUND

Today, a tremendous number of online services and applications are available. The existing online services are related to virtually every aspect of life, including work, relationships, health, entertainment, news, etc. Access to these online services typically only requires an Internet connection. However, the abundance of services also causes information overload. As a result, disorganized information is floating around many users' lives and brains. Instead of positively influencing our lives, the services become cumbersome and are often neglected. In particular, the advent of social media has made it easier to share information with more people and make connections with people who we otherwise would not. However, the ubiquity of social media (such as through social networks) has created a further explosion in the information content of our lives and relationships. This information clutter reduces a user's productivity and shortens the user's attention span.

Typically, ideas begin with private thoughts that are later refined and shared to friends and, perhaps, the public at large. Who these ideas are to be shared with often evolve over time. Existing online services are not amenable to this process of developing ideas and deciding where to share them at a later time. For example, existing social media forces ideas immediately into the public domain. Information or media posted on social networks (e.g. Facebook.com, Twitter.com, and Flickr.com) or blogs (e.g. Wordpress.com and Blogger.com) are immediately accessible by other users. To post information in existing social media requires upfront cognitive decision-making related to the audience level of the information at the time the information was collected or generated. This process does not match the way human brains function.

Systems, such as emailing to oneself and note-taking applications (e.g. Evernote.com) exist for users to store private thoughts. However, these existing systems are not integrated with other services or applications. In other words, a user would have to access and sign on to multiple applications simultaneously to utilize information stored in the application storing the private thoughts. Because of the lack of integration and inconvenience of these systems, they are seldom used, therefore, ideas are often forgotten. In addition, existing note-taking applications require users to provide all of the information content to the note. By forcing a user to provide all of the information content, the note-taking process is typically tedious, error-prone, and incomplete.

The present invention addresses at least the above-described difficult problems and advances the art with a semantic note taking system and method.

SUMMARY OF THE INVENTION

The present invention is directed to a semantic note taking system and method for collecting information, enriching the information, and binding the information to services. A plurality of users are communicatively connected to an application server to create one or more notes that can be bound to one or more of a plurality of services and stored in a database. The application server operates a plurality of functions, including a note taking function for allowing each of the users to create one or more notes, a categorizing function for labeling each of the notes with one or more changeable categories, a context function for associating one or more context traits with each of the notes, a binding function to establish one or more changeable binding rules for each of the notes, wherein the binding rules determine one or more of the services where the note is to be bound, and wherein the binding rules are related to the content of the note, the categories of the note, the context traits of the note, a user binding selection, or any combination thereof, and a communication function for communicating each of the notes to one or more of the services where the note is to be bound.

A note includes text, audio media, visual media, audio-visual media, recorded data, a weblink, a pointer to an information source, or any combination thereof. In an embodiment, one or more of the context traits associated with the note includes a time, a location, physical data relating to the user device used to generate the note, or any combination thereof. In another embodiment, relevant data is derived based on one or more of the context traits and the relevant data is attached to the note. The relevant data can be derived by matching one or more of the context traits with data from an information module such as a calendar, an address book, a contact list, a user profile, a user history, or any combination thereof. In an embodiment, one or more of the context traits associated with the note is based on one or more categories of the note, the content of the note, a user history, or any combination thereof.

In a preferred embodiment, the binding rules include one or more publication properties, such as an audience level for the note and/or one or more locations to publish the note. The locations to publish the note can include a private domain of the user, one or more friends of the user, one or more computer-implemented social networks, a blog, an online discussion board, a website, or any combination thereof. In an embodiment, the binding rules are automatically determined based at least partially on one or more of the categories, one or more context traits, the note content, a user history, or any combination thereof.

The application server of an embodiment of the present invention operates a suggestion function for suggesting one or more services, binding rules, and/or categories. The suggestions can be based at least partially on one or more the categories, one or more of the context traits, the note content, a user history, one or more binding rules, or any combination thereof. In an embodiment, a note is automatically bound to one of the suggested services. Preferably, the suggestion function uses a user history of selections of services and/or categories.

In an embodiment of the present invention, a user interface is provided to allow user entry of the categories and binding rules for a note, wherein the user interface includes a first symbol associated with the categories of the note and a second symbol associated with the binding rules of the note. Preferably, the user entry of the first symbol triggers a display of one or more of the categories suggested to the user and selectable by the user. Similarly, the user entry of the second symbol triggers a display of one or more of the binding rules suggested to the user and selectable by the user. In another embodiment, a user interface corresponding to each of the services where a note can be bound is provided. Each of the service-specific user interfaces includes one or more buttons for initiating an action for the service corresponding to the user interface. Preferably, a single click of one of the buttons initiates creation of the note, automatic addition of content to the note, automatic labeling of the note with categories, and communication of the note to the service corresponding to the user interface.

In an embodiment, the user device operated by users to access the application server is a mobile device that communicates with the application server over a wireless network. The services where a note can be bound are selected from the group consisting of a website, a web application, a computer-implemented social network, a blog, a review website, a product review website, an entertainment website, a health application, a medical application, an online retailer, an email application, a research application, a clinical application, a calendar, and an address book.

In an additional embodiment, a method for collecting and recognizing information from a monitoring device is provided. On a mobile computer device a user can capture an image of a monitoring device. Examples, without any limitation, of monitoring devices are a health monitoring device, a sport device, a training device, a medical device, or the like. The image captures at least two aspects: (1) monitored data tracked or acquired by the monitoring device (e.g. weight, miles run, blood pressure, etc.), and (2) a portion of the monitoring device sufficient to recognize the monitoring device. A text recognition function is provided (either on the mobile device or by an application server) for (prefeably automatically) recognizing and converting the monitored data visible in the captured image into quantifiable data (e.g. 70 kg, 10 miles, 120/60, etc.). In addition, a monitoring device recognition function is provided (either on the mobile device or by an application server) for (prefeably automatically) recognizing the monitoring device (e.g. in terms of type, kind, brand, model, or a combination thereof). In one example, the monitoring device recognition function uses a library of information related to monitoring devices for recognizing the imaged monitoring device. A categorizing function for categorizing the quantifiable data, recognized monitoring device, or a combination thereof can be provided according to one or more categories.

In one example, a note taking function is provided to allow a user to create a note on a user device. Examples of notes are text, audio media, visual media, audio-visual media, recorded data, a weblink, a pointer to an information source, or any combination thereof. The notes can be enriched (or vice versa) with the quantifiable data, the recognized monitoring device, one or more of the categories, or a combination thereof.

In another example, one or more context traits can be associated with the quantifiable data, the recognized monitoring device, one or more of the categories, the notes, or a combination thereof Context traits are for example a location, a place, a time, a source, a related note, a person, people, a group, a tag, an identity, sensor data, a media file, an audio file, physical data relating to the monitoring device or the mobile computer device, derived data, or any combination thereof.

In yet another example, a services suggestion function is provided for suggesting one or more of services where the quantifiable data, the recognized monitoring device, the notes or one or more of the categories can be (manually or automatically) bound.

BRIEF DESCRIPTION OF THE FIGURES

The present invention together with its objectives and advantages will be understood by reading the following description in conjunction with the drawings, in which.

DETAILED DESCRIPTION OF THE INVENTION

The abundance of online services provides users with opportunities to perform many tasks and connect with numerous people from nearly any location. However, the large number of services often cause information overload and a user cannot efficiently organize the explosion of information content concerning the user's life, work, and relationships. The present invention is directed to a semantic note taking system and method to collect, enrich, and bind information to services. Semantic note taking allows users to effortless offload information from private thought streams for later determination of where to bind these thoughts. In addition, semantic note taking minimizes the friction to record and share ideas by automatically enriching the note and reducing unnecessary user input. In other words, the present invention is directed to a system and method to collect unscripted data, add more meaning and use out of the data, and bind the data to services.

Figure 1:
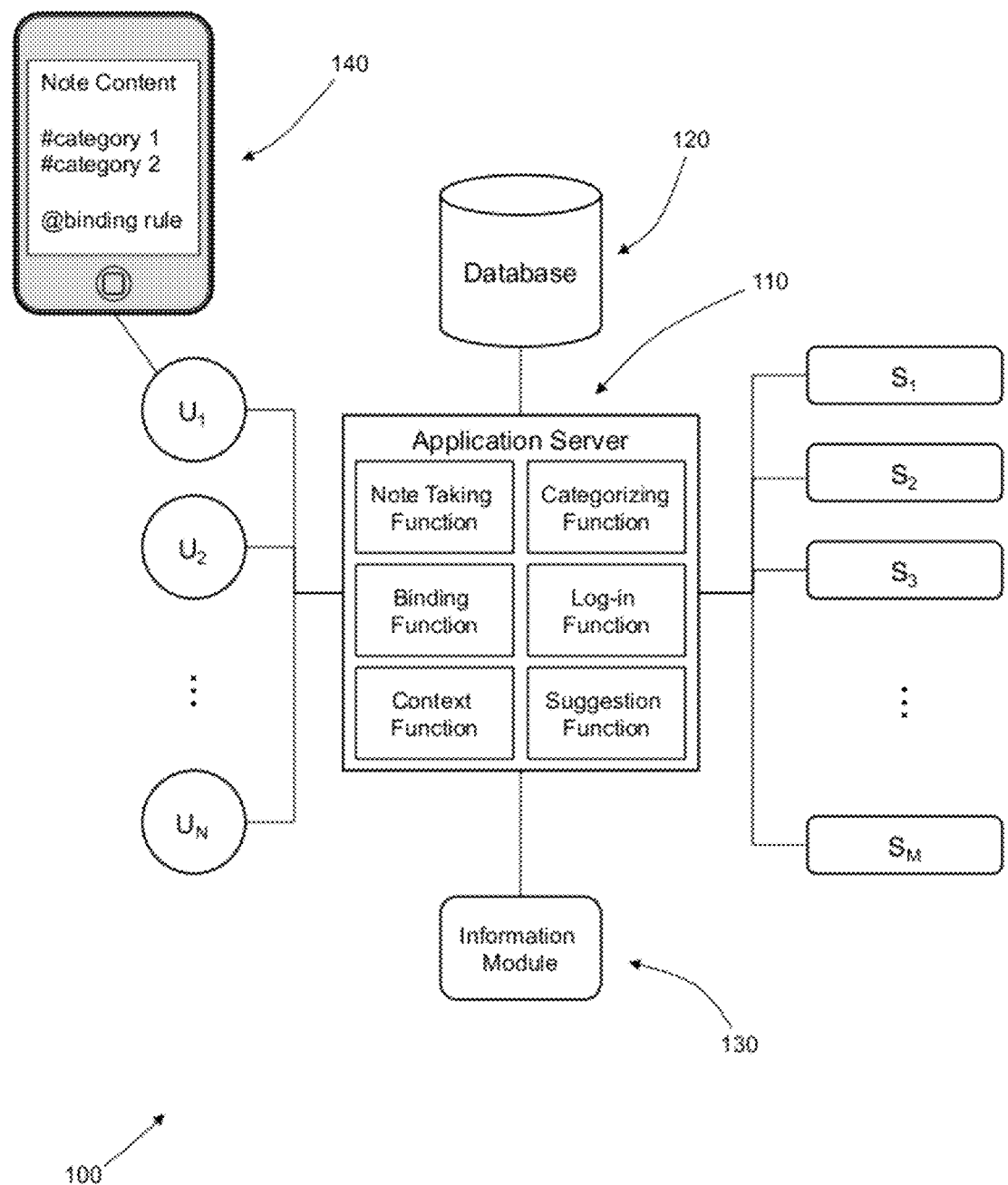
FIG. 1 shows an example of a semantic note taking system according to the present invention.

FIG. 1 shows a preferred embodiment of a semantic note taking system 100 according to the present invention. The semantic note taking system 100 includes an application server 110 that is accessible by a plurality of users $U_1$-$U_N$ for creating one or more notes, categorizing the notes, and binding the notes to one or more services $S_1$-$S_M$. The users $U_1$-$U_N$ connect to the application server 110 through any device capable of being communicatively connected to a network, such as the Internet. The user devices can include a computer, a laptop, a personal digital assistant (PDA), a cell phone, a mobile device, or a smart phone. FIG. 1 shows user $U_1$ with a mobile phone 140 that is connected to the application server 110, such as through a wireless network.

A note taking function, operated by the application server 110, allows each of the users $U_1$-$U_N$ to create one or more notes. Notes can include text, audio media, visual media, audio-visual media, recorded data, a weblink, a pointer to an information source (e.g. a bookmark), or any other type of data. Notes created by the users $U_1$-$U_N$ are transmitted from the user devices to the application server 110 and stored in the database 120 for later binding to one or more of the services $S_1$-$S_M$.

The application server 110 also operates a categorizing function to label the notes with one or more categories. In an embodiment, the categorizing function allows users $U_1$-$U_N$ to label the notes, though automatic or suggested note labeling is also possible. It is noted that one or more of the categories of each note is changeable. Labeling a note with categories enriches the note. The note is further enriched by the context function operated by the application server 110, which associates one or more context traits with the note. Context traits associated with a note can be based on one or more of the categories of the note, the content of the note, a user history, or any combination thereof. Examples of context traits include a time, a location, and physical data relating to the user device. For example, the mobile phone 140 of user $U_1$ is capable of measuring the location where the note was created (e.g. by using GPS measurements) and this location can be automatically associated with the note without user input, thereby enriching the note.

Context information is not restricted to a time-stamp or location-stamp associated with the note. In a preferred embodiment of the present invention, relevant data is derived based on one or more of the context traits. Relevant data can be derived by matching one or more of the context traits with data from an information module 130, such as a calendar, an address book, a contact list, a user profile, a user history, or any combination thereof. For example, a time context trait when the note is created is matched with a meeting time indicated by a calendar information module. Because the calendar includes relevant data, e.g. the participants of the meeting and the discussion topics of the meeting, this relevant data can be attached to the note to further enrich the note.

A binding function is provided to establish one or more binding rules for a note. The binding rules determine one or more services $S_1$-$S_M$ or applications where the note is to be bound. The binding rules are related to the content of the note, the categories of the note, the context traits of the note, a user binding selection, or any combination thereof. In an embodiment, the binding rules of a note are automatically determined based at least partially on one or more categories of the note, one or more context traits, the content of the note, the user history, or any combination thereof.

The services $S_1$-$S_M$ where a note can be bound can include a website, a web application, a computer-implemented social network, a blog, a review website, a product review website, an entertainment website, a health application, a medical application, an online retailer, an email application, a research application, a clinical application, a calendar, an address book, or any combination thereof. A note that is bound to a service is communicated to the service. What is done with the note after it is communicated depends on the particular functions of the service and the content of the note. For example, a note bound to a blog could be published on the blog and a note bound to a research application can include data for analysis by the research application. In addition to communicating a note to a service, in an embodiment of the present invention, data can be extracted from the service where the note is bound and the extracted data is added to the note.

The services $S_1$-$S_M$ shown in FIG. 1 are generally not integrated and some of the services $S_1$-$S_M$ where a note can be bound may also require user login or authentication. To facilitate the integration of the services and allow access to the services, in an embodiment, the application server 110 includes a login function to provide login information for access to the services. Integration of the services enables a user to collect or create information content and offload the content to a single location, instead of having to interact with a myriad of different services separately.

Figure 2:
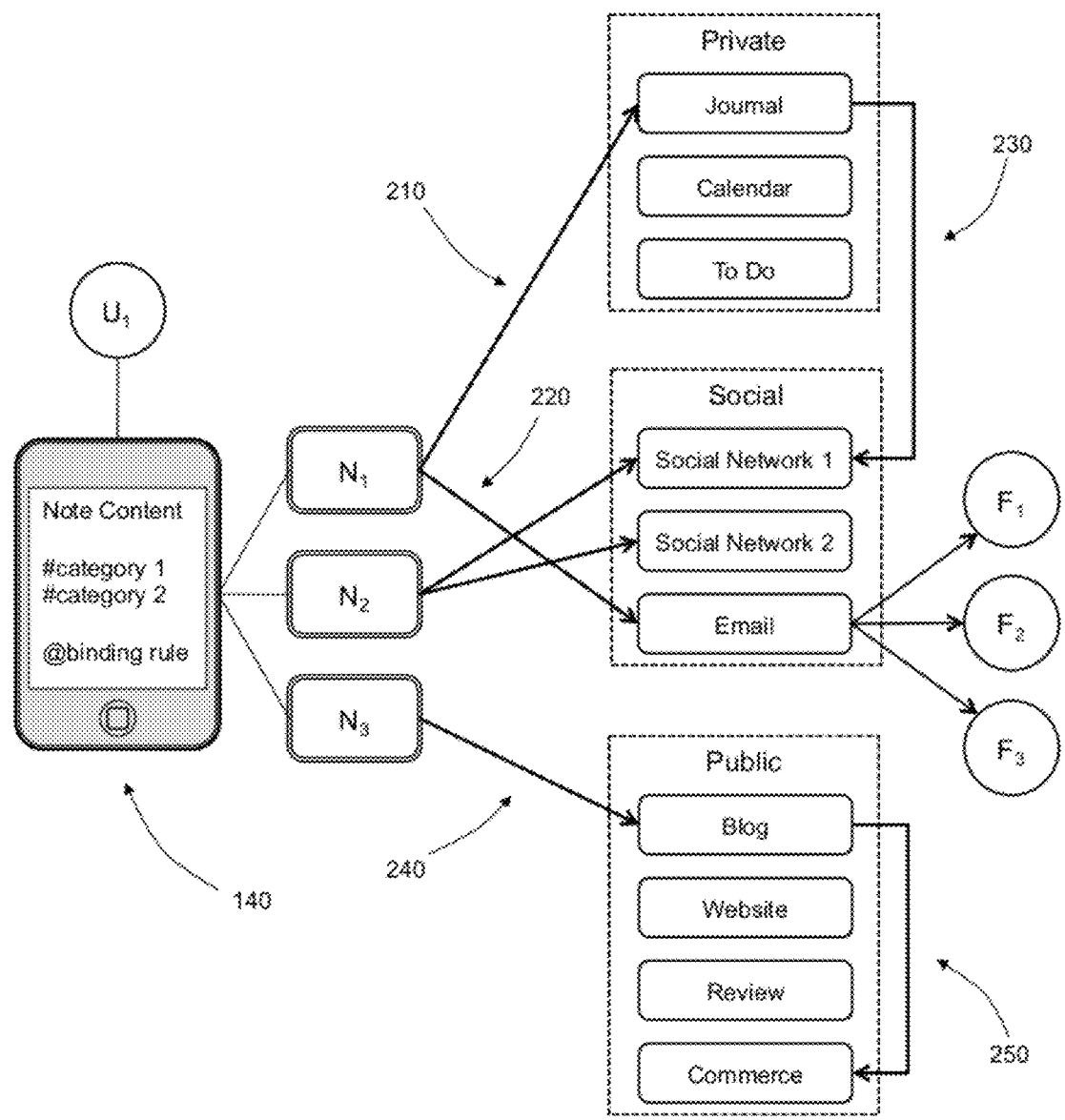
FIG. 2 shows an example of mutable binding of notes to multiple services according to the present invention.

In a preferred embodiment of the present invention, the binding rules comprise one or more publication properties. The publication properties include an audience or privacy level for the note and the location to publish the note. FIG. 2 shows three notes $N_1$, $N_2$, and $N_3$ created by user $U_1$ and the binding of these notes to different services. The audience levels generally include private, social, and public designations. The locations to publish the note includes a private domain of the user, one or more friends $F_1$-$F_3$ of the user, one or more computer-implemented social networks, a blog, an online discussion board, a website, or any combination thereof. FIG. 2 shows note $N_1$ bound 210 to a private journal and bound 220 to an email application. In other words, the binding rules for note $N_1$ indicate that the note should be communicated to the journal service and the email application with the appropriate audience levels.

A note can be bound to any number of services at any time. Importantly, the binding of the note is changeable. In other words, a user can change the binding rules to alter the location where a note is to be bound. In FIG. 2, note $N_1$ is originally bound 210 to a journal but is later bound 230 to Social Network 1. Similarly, note $N_3$ is originally bound 240 to a blog, but is later bound 250 to an electronic commerce website. The mutable binding rules and late-binding method of the present invention is in accord with how ideas are typically generated in our brains. In particular, ideas and information typically start as private thoughts that are later shared and discussed with people we know. Finally, the information is published to the world. This is in contrast to existing social media where generated media are forced immediately into the public realm.

FIG. 2 also shows note $N_1$ published and communicated to associates or friends $F_1$-$F_3$ of user $U_1$. By publishing note $N_1$ to friends $F_1$-$F_3$, an ad hoc community or an ad hoc social network is developed around note $N_1$. In an embodiment, one or more of the friends $F_1$-$F_3$ can change the note $N_1$. In particular, data can be extracted from one of the friends $F_1$-$F_3$ and the extracted data is added to the note $N_1$.

Figure 3:
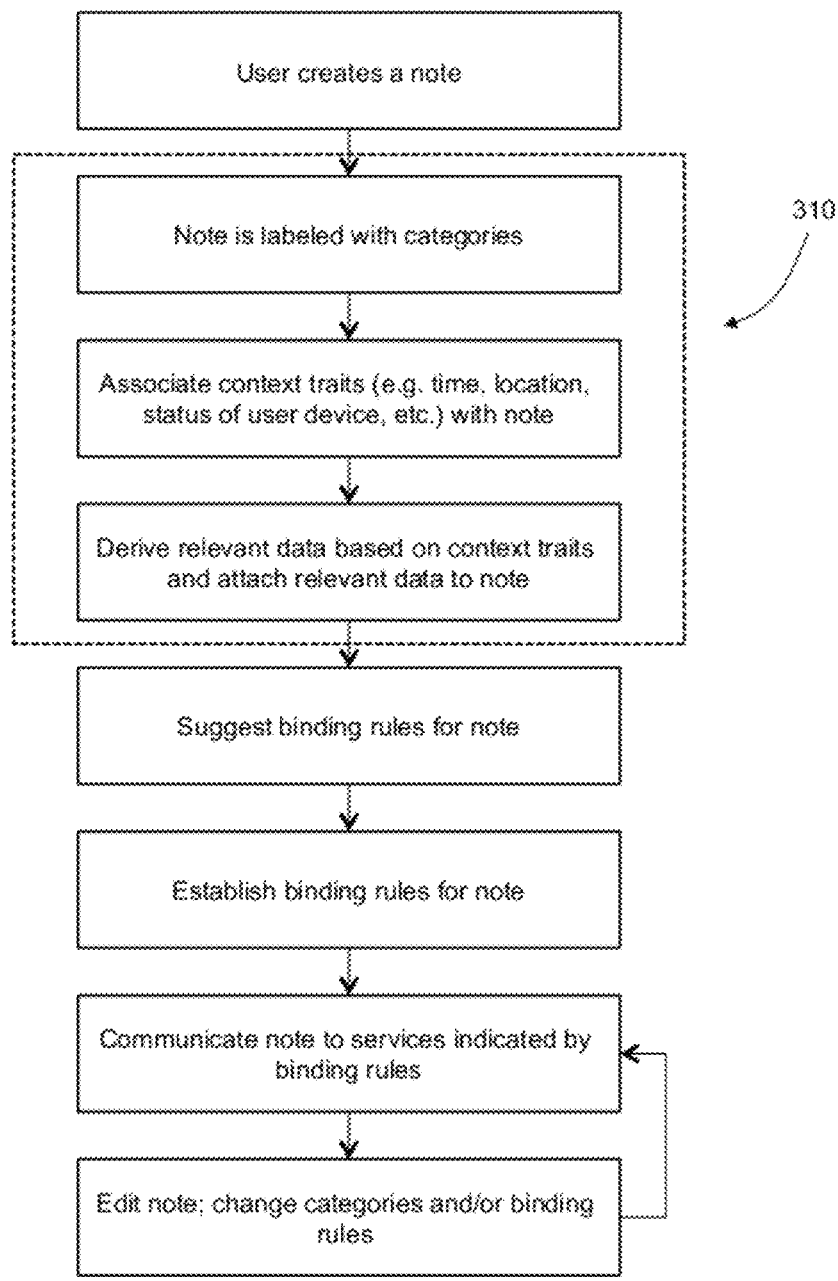
FIG. 3 shows a flow chart of an example note creation, enrichment, and binding according to the present invention.
Figure 4:
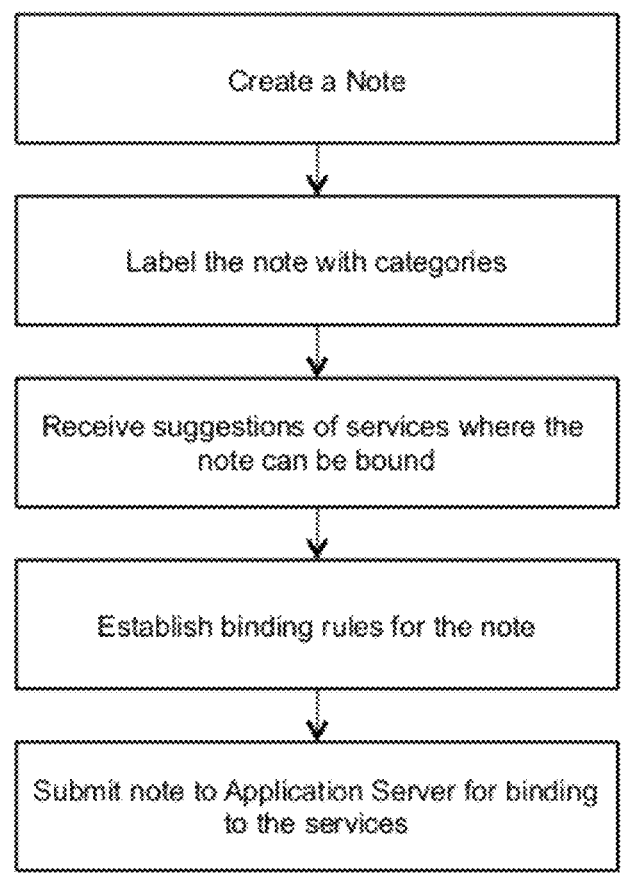
FIG. 4 shows a flow chart of example steps taken by a user according to the present invention.

FIGS. 3 and 4 show flow charts for exemplary methods of creating, enriching, and binding the notes according to the present invention. The steps circled with a dashed line 310 in FIG. 3 show the enrichment of the notes by labeling the note with categories, associating context traits with the note, and deriving relevant data based on the context traits. FIG. 4 shows the steps undertaken by a user of the semantic note taking system of the present invention.

Figure 5:
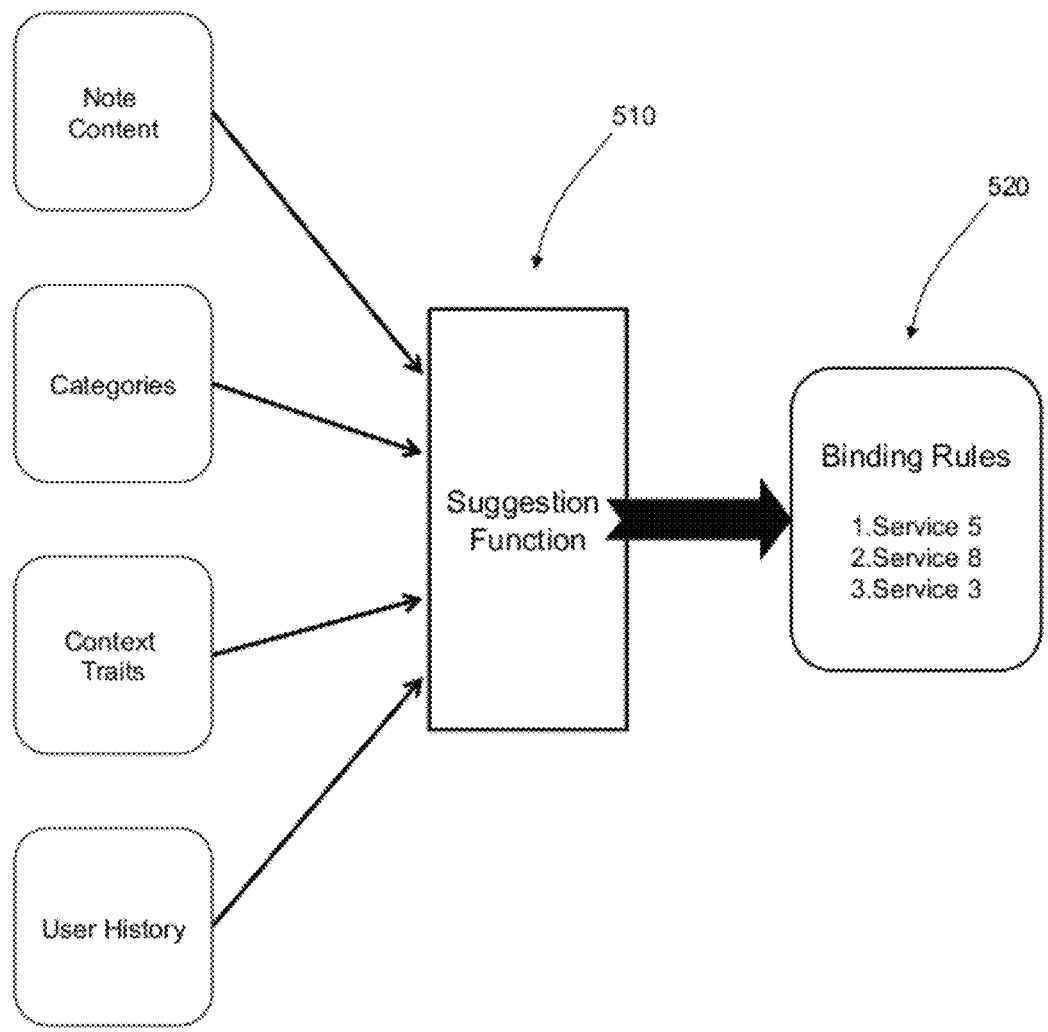
FIG. 5 shows an example of a suggestion function according to the present invention.

FIGS. 3 and 4 also include the steps of suggesting binding rules and receiving suggestions, respectively. The application server operates a suggestion function for suggesting one or more services where the note can be bound to the user who created the note. FIG. 5 shows the inputs for the suggestion function 510, which can include the content of the note, the categories of the note, the context traits, and/or the user history. Based on these inputs, the suggestion function 510 suggests binding rules 520, such as a list of suggested services where the note can be bound. For example, FIG. 5 shows a ranked list of services with "Service 5" being the top-ranked service where the note can be bound.

In an embodiment, the suggested services or binding rules are selectable by the user, where the user selection binds the note to the selected service. User selections can be stored for reference by the suggestion function. For example, a first note is created by a user, labeled with "Category 4", and bound to "Service 5" by user selection. Because of this user selection, "Service 5" would be suggested for a second note also labeled with "Category 4". It is noted that the first and second notes can be created by the same user, or they can be created by different users. In other words, the suggestion function 510 can rely on the user history of the same user or the user history of a community of users. It is noted that the association of a service to a category is mutable and evolvable depending on user behavior. For example, though "Category 4" and "Service 5" are associated in the above example, the association of services for "Category 4" could change to "Service 3" if users frequently alter the selection from "Service 5" to "Service 3" for notes having a label of "Category 4".

In an embodiment, a note is automatically bound to one of the suggested services without user selection. In a preferred embodiment, the storage of past user selections enables intelligent and automatic binding of notes to services. Automatic binding of notes to services reduces the need for user input.

The suggestion function 510 is also capable of suggesting categories to label a note in addition to or replacement of suggesting binding rules. Suggestions of categories can be analogous to the suggestions of services described in the previous paragraphs. In particular, suggestions of categories can be based on the content of the note, the context traits of the note, other categories of the note, a user history, the binding rules established for the note, the services determined by the binding rules, or any combination thereof. For example, a note contains a description of a product. Based on this note content, a category named "product" is suggested to the user for labeling the note. In another example, the association of a service and a category based on a user history can be used to suggest one or more categories for notes having binding rules with that particular service. In an embodiment, a note is automatically labeled with one or more suggested categories.

Figure 6:
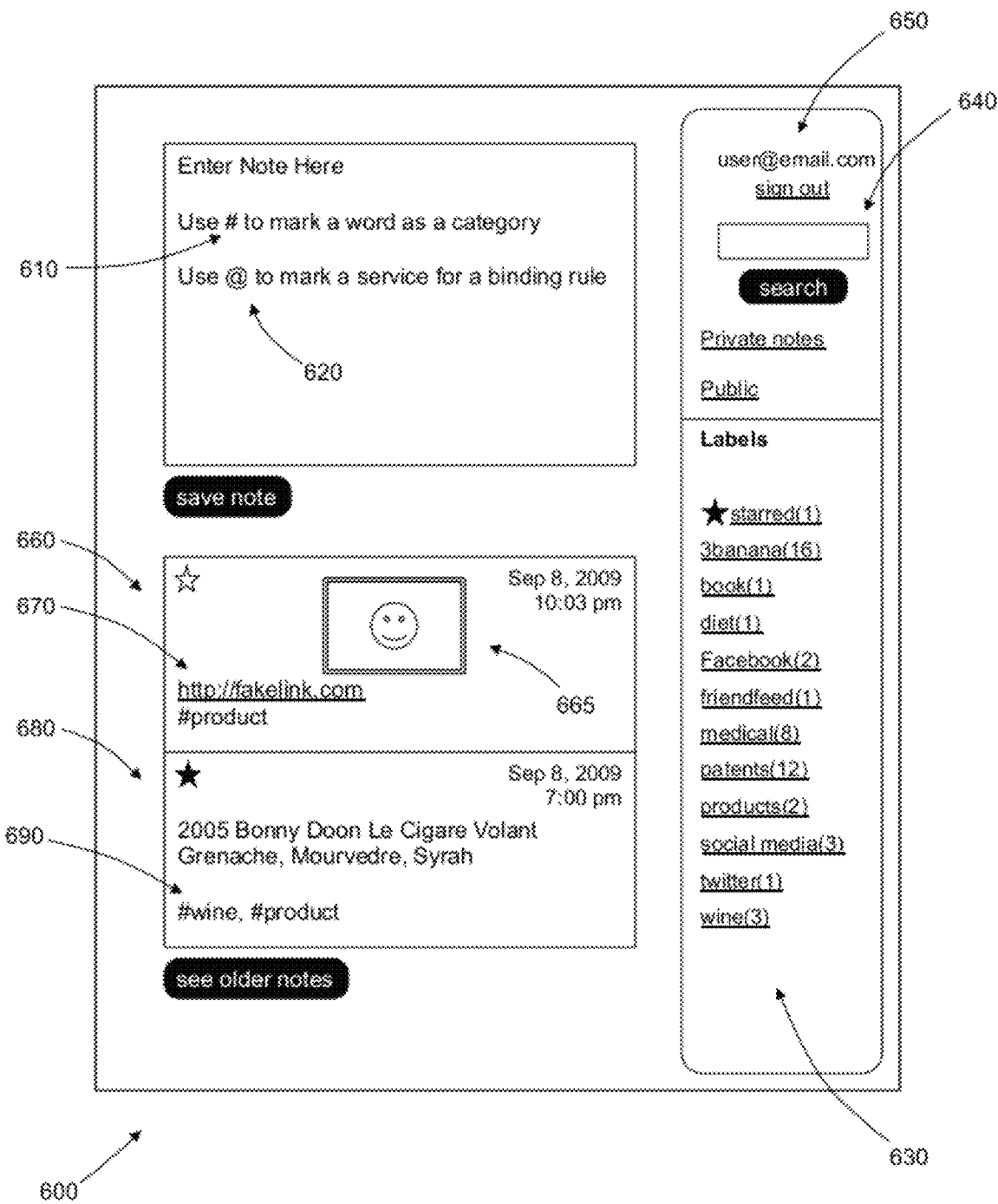
FIG. 6 shows an example user interface for semantic note taking according to the present invention.

FIG. 6 shows an example user interface 600 for user creation of a note and user entry of categories and binding rules for the note. In an embodiment, the user interface 600 is accessible via a web browser. However, alternative methods of accessing user interfaces known in the art may also be used. In a preferred embodiment, the user interface 600 allows user entry of a first symbol 610 to designate entry of a category and a second symbol 620 to designate entry of a binding rule. As shown in FIG. 6, the first symbol 610 is the "#" sign and categorization is accomplished by placing a "#" symbol adjacent to a word. Similarly, the second symbol 620 is the "@" sign to mark a service for a binding rule. The first 610 and second 620 symbols allow easy entry of categories and binding rules. As can be appreciated by one or ordinary skill in the art, the present invention is not limited to the use of symbols for categorization and binding rules.

In a preferred embodiment, entry of the first symbol 610 triggers a list of previously used categories to be displayed to the user. In particular, the list can be filtered to only include categories that may be relevant to the note, such as based on the content of the note or the context traits of the note. In an embodiment, users can override suggestions and label the note with non-suggested category or a new category. Similarly, entry of the second symbol 620 triggers a list of services or binding rules to be displayed to the user. In a preferred embodiment, user selection of a category to label the note triggers a display of suggested services where the note can be bound. Conversely, user selection of a binding rule triggers a display of suggested categories to label the note. The suggestions can be based on previously stored user selections, i.e. a user history, or any other bases as described herein with respect to the suggestion function.

The user interface 600 also includes a list of categories 630 used in all stored notes. A user can select a category from the list 630 to view notes labeled with the selected category. In an embodiment, a search box 640 is also available to find previously saved notes. FIG. 6 also shows previously saved notes 660 and 680. The note 660 includes a photo 665 and a weblink 670. The note 680 includes text description of a wine and is labeled 690 with the categories "wine" and "product" by use of the first symbol. The user interface 600 also includes a user name 650, such as the user's email address. In an embodiment, the application server requires a user authentication to access the semantic note taking system.

Embodiments of the present invention are also directed to user interfaces corresponding to services to facilitate simple collection of data and binding to services. In an embodiment, a user interface is provided for each of the services where a note can be bound. The user interface corresponding to a particular service includes one or more buttons for initiating an action specific to that service. Service specific user interfaces are referred to as semantic skins. In a preferred embodiment, a single click of a button on a semantic skin initiates the creation of a note, automatic content generation and addition to the note, automatic labeling of the note with one or more categories appropriate to the service, and communication of the note to the service.

Figure 7A:
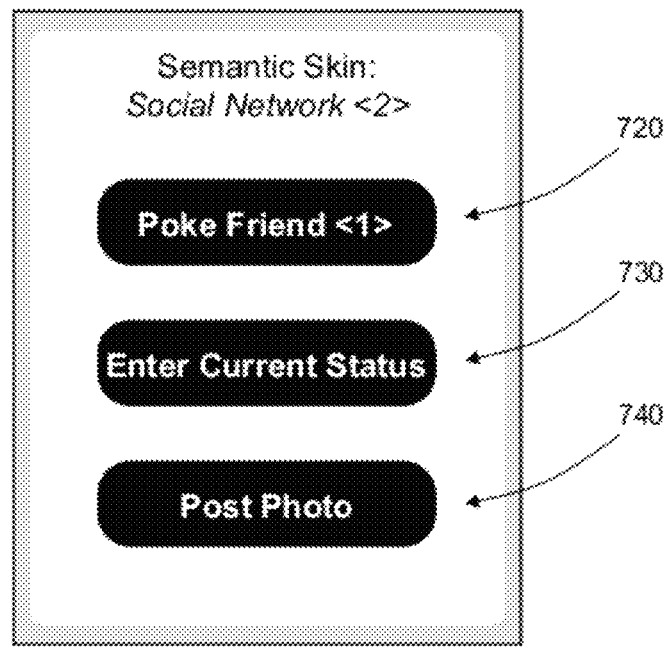
FIGS. 7A-B show examples of semantic skin user interfaces corresponding to services according to the present invention.
Figure 7B:
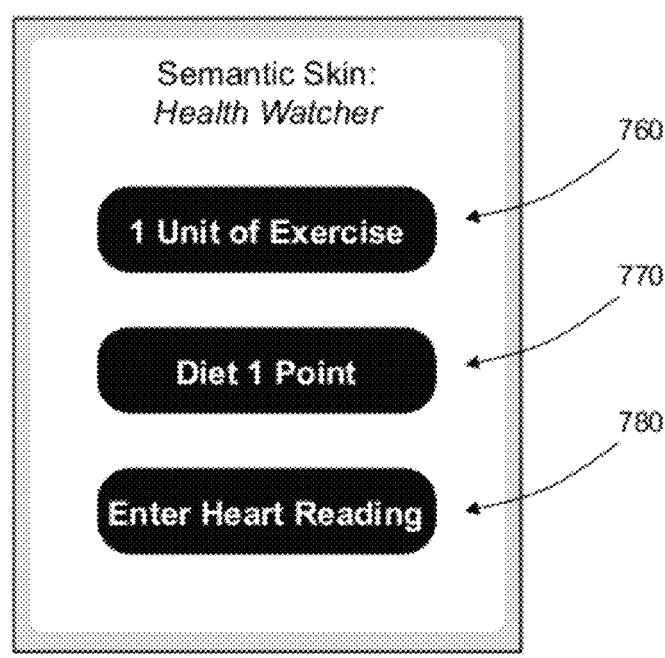

FIG. 7A shows an example of a semantic skin 710 for a social network service and FIG. 7B shows an example of a semantic skin 750 for a health or diet application. The semantic skin 710 includes a button 720 to "poke" a friend of the user in the social network, a button 730 to submit the current status of the user, and a button 740 to post a photo to the social network. The semantic skin 750 in the example shown by FIG. 7B includes a button 760 to enter exercise activity, a button 770 to enter diet information, and a button 780 to measure medical readings. The semantic skins can rely on context traits derived from the device where the data entry is performed. For example, the button 730 of semantic skin 710 can utilize the current location of the user as measured by the user device and publish that location to the social network. In another example, a user is operating a device that includes a heart monitor and the button 780 extracts heart rate measurements, attaches the measurements to a note, and communicates the note to a health service.

In a preferred embodiment, buttons in user interfaces and semantic skins are programmable. The buttons serve the purpose of providing simple or single click entry of data and minimizes the friction for a user to collect information and bind the information to services.

FIGS. 8-11 include details of a functional embodiment of the present invention. The exemplary embodiment shown in FIGS. 8-11 are directed to social network services, such as Facebook.com and Twitter.com, though its extension to other services can be appreciated by one of ordinary skill in the art. The present invention is not limited to the embodiment of FIGS. 8-11; alternatives to the services and applications described in FIGS. 8-11 can be identified by one of ordinary skill in the art.

Figure 8:
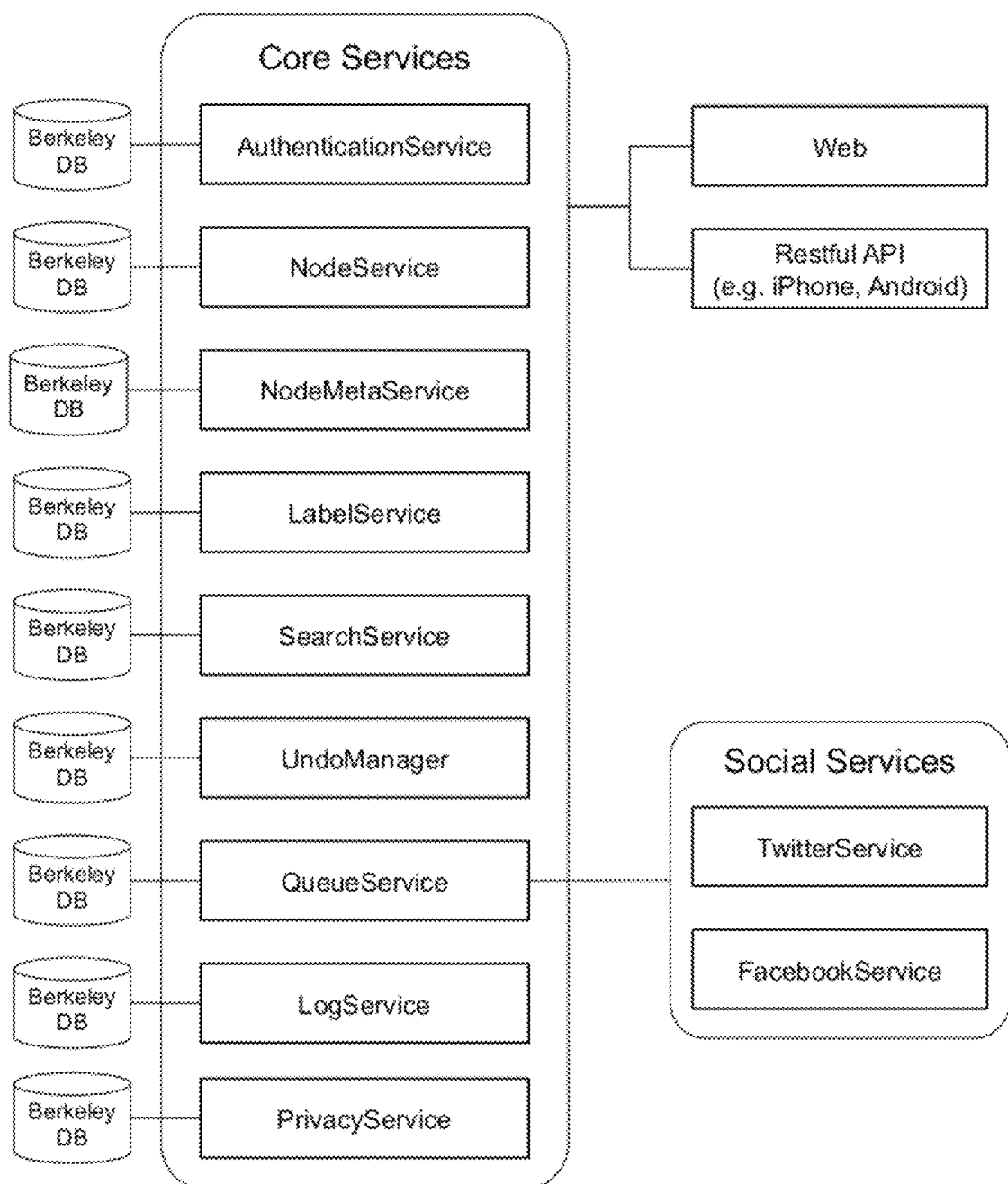
FIG. 8 shows the core services of an exemplary embodiment of the present invention.
Figure 9:
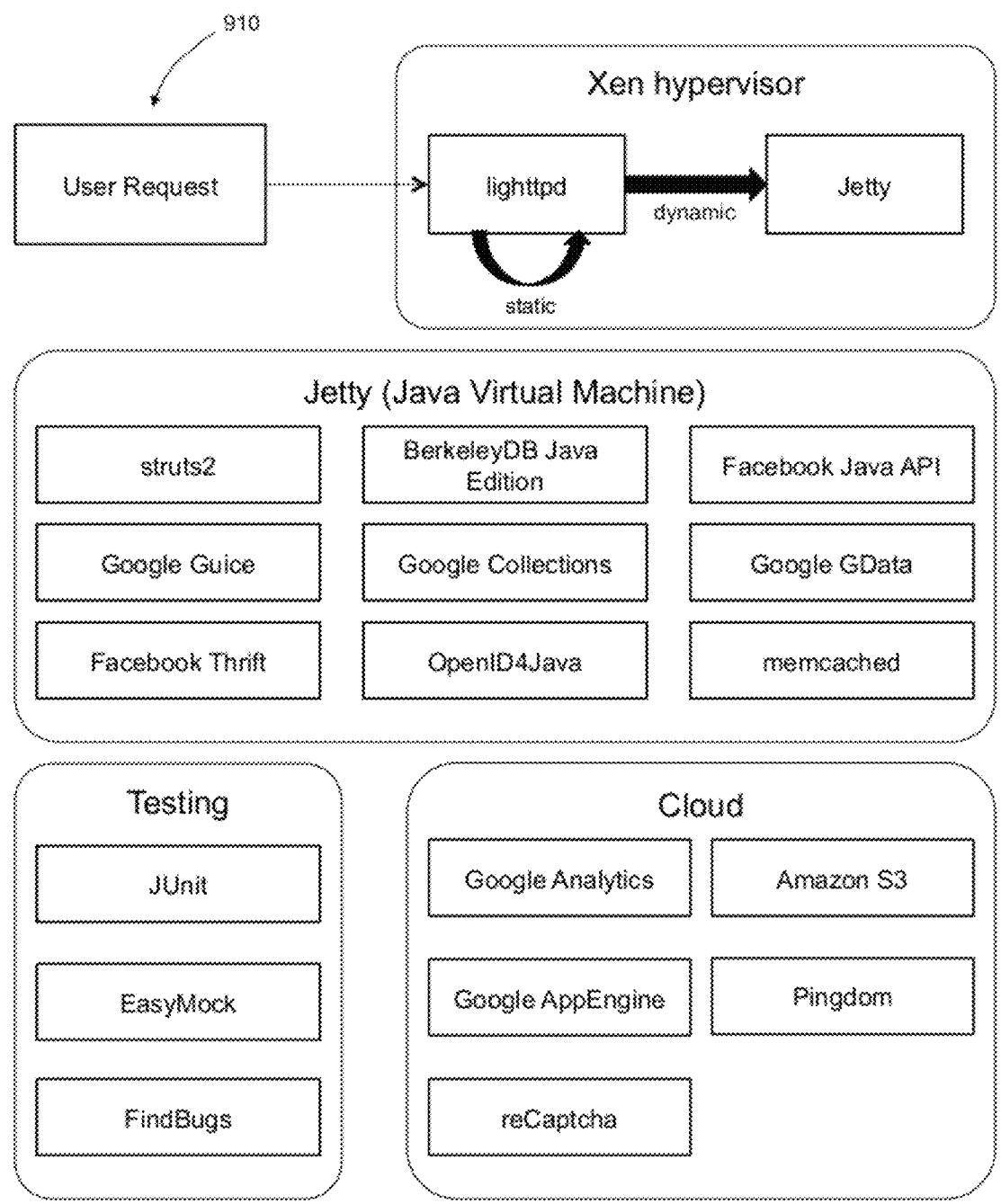
FIG. 9 shows the technology services underlying the core services shown in FIG. 8.

FIGS. 8-9 show the technologies used by the application server in an exemplary embodiment of the present invention. The core services are shown by FIG. 8 and include the AuthenticationService, NodeService, NodeMetaService, LabelService, SearchService, UndoManager, QueueService, LogService, and PrivacyService. Each of the core services has its own instance of a BerkeleyDB Java Edition as a backing store. FIG. 9 shows an initial user request 910 that is handled by a web server, e.g. lighttpd. Lighttpd serves up all the static content. If the request is for dynamic content then it is forwarded to the Jetty Java Application Server. Jetty runs inside of the Java Virtual Machine. In the embodiment shown in FIG. 9, the struts2 web framework is used inside of Jetty. Struts2 determines which services are needed to fulfill the request and uses Google Guice to create all the objects needed by the user. After all the objects have been created, struts2 fulfills the users request and generates the page. The jQuery JavaScript library is used to speed up and simplify cross-platform development. Google collections Library is used to augment the standard Java collections.

Figure 10:
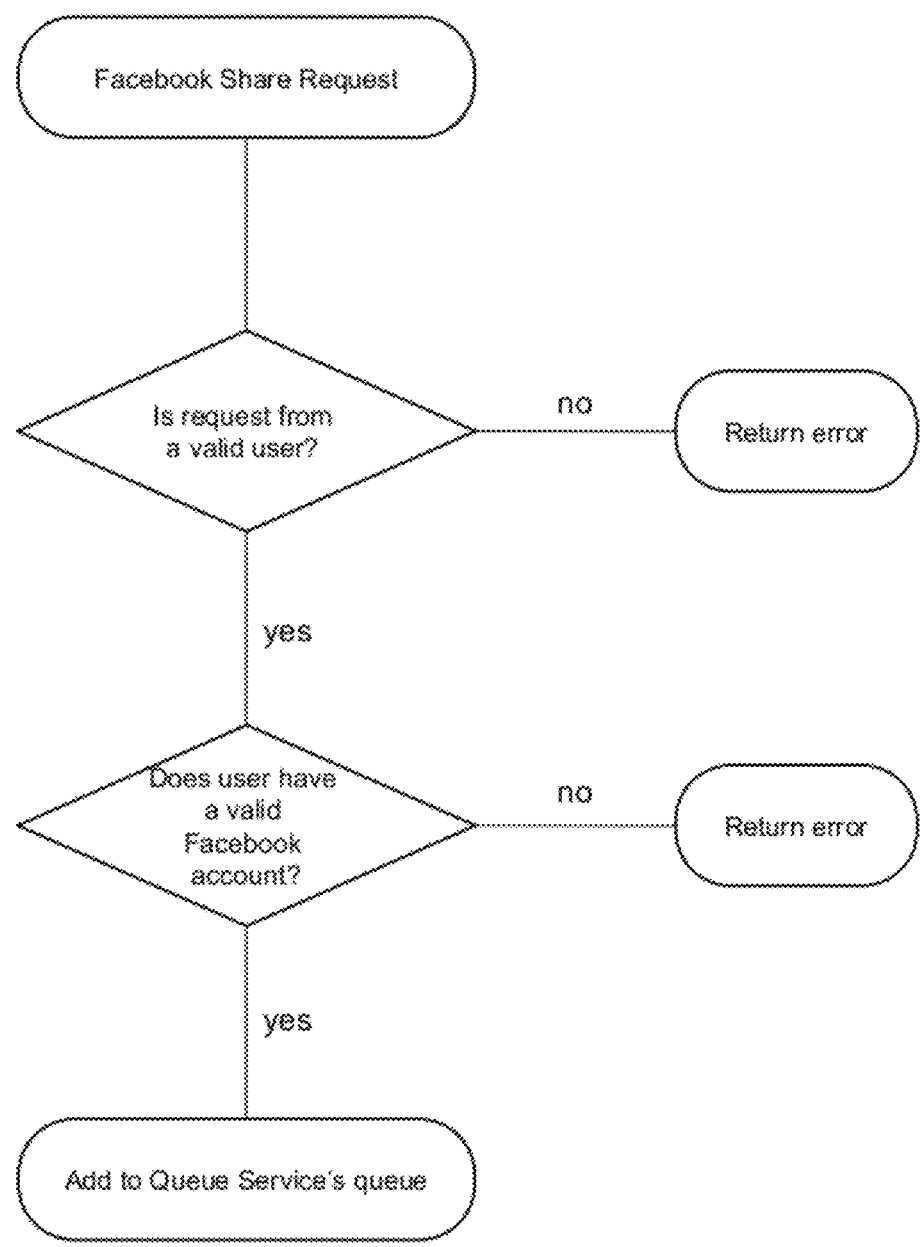
FIG. 10 shows a flow chart of an example login and authentication function in an exemplary embodiment of the present invention.

FIG. 10 shows a flow chart related to the AuthenticationService of an exemplary embodiment of the present invention. The AuthenticationService allows a user to communicate with any service that requires authentication or login information; thereby the semantic note taking system can be integrated with any number of third party applications and services. In the example shown in FIG. 10, a user request to share a note on Facebook is shown. The request is handled by struts2, which checks if the user is a valid user of the semantic note taking system. If the request is from a valid user, a request is sent to the FacebookService to verify if the user has valid Facebook credentials. If the user has a valid Facebook account, the request is sent to the QueueService to en-queue the Facebook share request.

Figure 11:
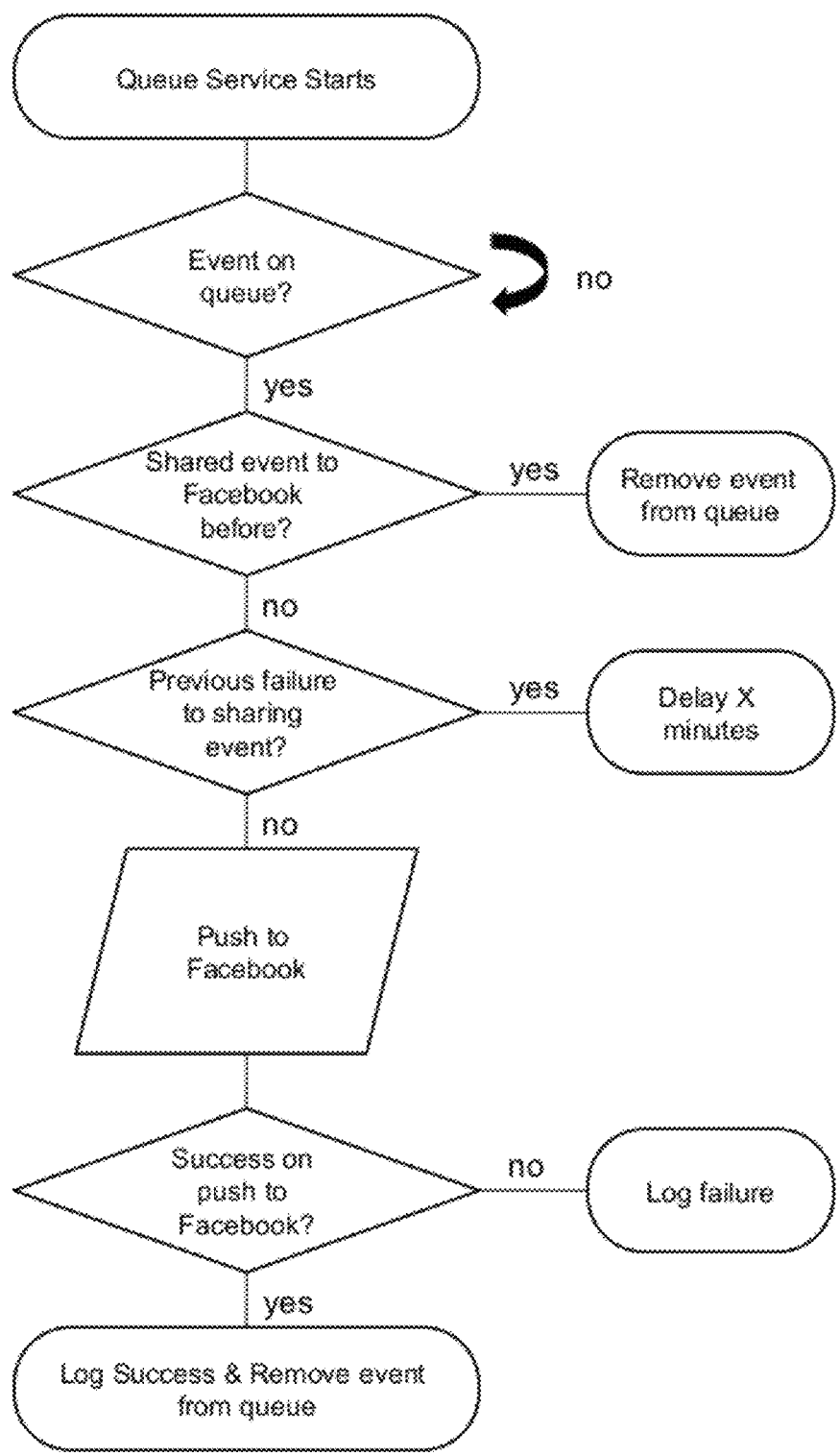
FIG. 11 shows a flow chart of an example Queue service in an exemplary embodiment of the present invention.

FIG. 11 shows a flow chart related to an embodiment of the QueueService. When an event is en-queued in the QueueService's queue, the QueueService checks if the note associated with that event has been previously shared to Facebook. The LogService tracks when a note has been successfully shared to Facebook. If the note has been previously successfully shared, it is removed from the queue. The QueueService then checks if there was a problem sharing the note. If the note has had a failure, the share event is timed out and put back in the queue to be run after X minutes. The note is then pushed to the user's Facebook account. The note is pushed by the QueueService calling the FacebookService to fulfill the share request. If the request succeeds, the event is removed from the QueueService's queue and logged to LogService.

EXAMPLES

The following examples demonstrate exemplary applications for the embodiments of the present invention. It is noted that applications for the present invention are not limited by these examples; other applications of the present invention can be identified by one of ordinary skill in the art.

Example 1

Product Review

A user enjoys a product, such as a glass of wine. During a dinner engagement The user jots down information related to the wine, such as the brand, vintage, variety, etc., by accessing a user interface to the semantic note taking system. The note includes a label of "#wine" for future reference to the note. Context traits, including the GPS coordinates where the note was created is associated with the note. Using the GPS coordinates and accessing a directory information module, the name of the restaurant is derived and automatically associated with the note. The note is saved in the database.

At a later date, the user chooses to discuss the wine with friends of the user who may be wine enthusiasts. By binding the wine review note to a social network or an email application, the note is communicated to one or more friends of the user. One of the friends writes a brief review of the wine and attaches that review to the note. After the note has been shared to friends of the user, the user decides to write a wine review to be posted on a wine website. The user refines the note and binds it to the wine review website to be published to the world.

Example 2

Retail

Figure 12A:
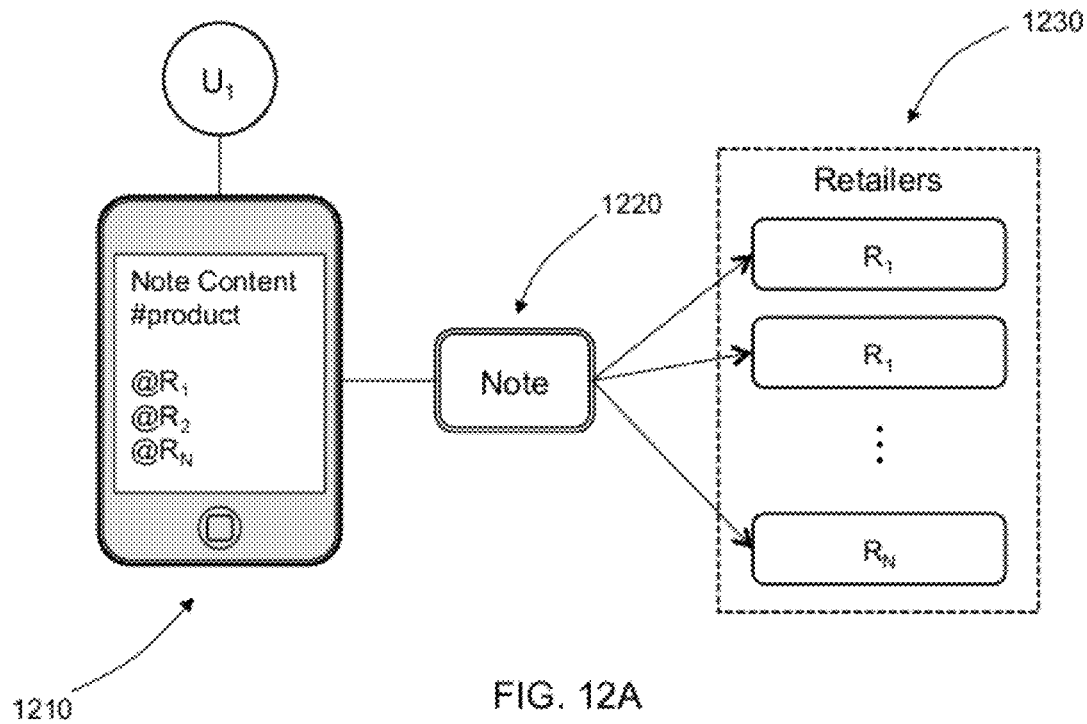
FIG. 12 shows an example of using semantic note taking with online retailers according to the present invention.
Figure 12B:
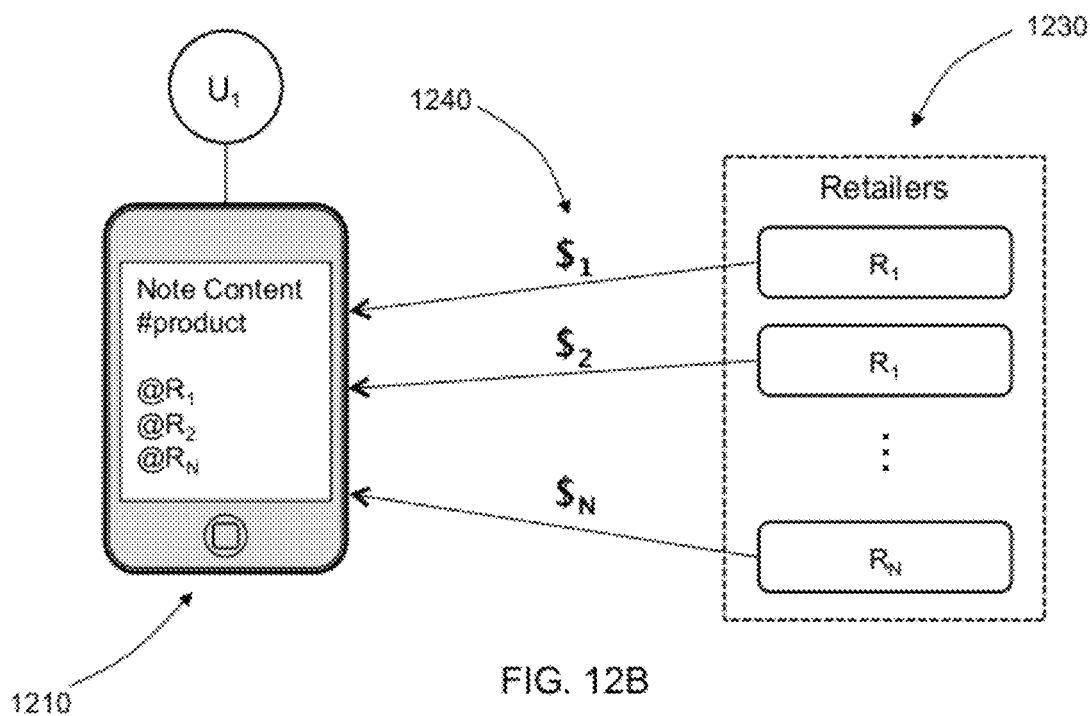

FIGS. 12A-B show an example of a retail application with bidding from multiple online retailers 1230. In FIG. 12A, user $U_1$ creates a note 1220 on a user device 1210. The note 1220 includes an identification of a product and binding rules that indicate it is to be bound to retailers $R_1$, $R_2$, and $R_N$. The note 1220 is communicated to the retailers $R_1$, $R_2$, and $R_N$ based on the binding rules. After the note 1220 is received by the retailers $R_1$, $R_2$, and $R_N$, the retailers send offers 1240 to user $U_1$ for the product described in the note 1220. Alternatively or additionally, the retailers $R_1$, $R_2$, and $R_N$ can send advertisements, coupons, or any information relating to the product to the user $U_1$.

Example 3

Health

The present invention can be directed to a dietary, health, or medical service. For example, with minimal friction, a user can submit his or her dietary behavior to be tracked by a diet service. In another example, medical information can be collected at a hospital visit or doctor's appointment and submitted to an electronic medical record (EMR) application.

Example 4

Research

The semantic note taking system of the present invention can also be applied to a research study. In an embodiment of the present invention, research data is collected in a note. The research data can be collected from the field via a mobile device. The research data is enriched with time and location context traits. For repetitive data collection, a semantic skin would provide simple one click user entry of data. For example, the present invention can facilitate frictionless data gathering from door-to-door surveys. A door-to-door surveyor would need not enter the address of each participant of the survey as location context traits would be automatically associated with the note. Relevant data (e.g. resident names and demographics) can be automatically accessed based on the location context traits,.

Another aspect of the present invention is directed to semantic note taking systems that link physical objects to the notes. In an embodiment, the system employs a two-dimensional bar code, such as a Quick Response (QR) code, that can be placed on or near a physical object. When imaged, the code links the physical object with one or more notes, such as by associating a public or private URL with the code. The QR code is preferably captured with a digital camera on a mobile phone, however, other methods of capturing the QR code can be used. The URL associated with the code can also be associated with notes from a semantic note taking system as described above, thereby the physical object is connected with the note.

The following describes an embodiment of a semantic note taking system and method with QR codes. First a note is created, enriched, and bound to services as described herein. A QR code is then generated and put on an object in the physical world. The object with the QR code is then viewed or imaged, preferably with a cell phone camera. As described above, the QR code is used to link the object with the note. It is important to note that contextual information can also be linked, including the location where the object was imaged, the history of the note, and other available contextual information. In addition, the note may be a shared note in an ad hoc network of users, therefore the other members of the ad hoc network are also linked with the imaged object.

In one embodiment, a private URL linked with the QR code and a note is available for users to bind with services or share with other users. In another embodiment, the QR code is linked with an encrypted link for restricted use, such as for managing private records of an organization. In this embodiment, encryption of the QR code can require an encryption key that is only possessed by authorized viewers, wherein the QR code is meaningless without the encryption key. An authorized viewer can view the QR code with his or her phone to generate encoded text, convert the encoded text using the encryption key into a link to a private URL. Encryption of the QR code allows it to be placed in public locations while maintaining privacy. For example, inventory located in a public location can be labeled with an encrypted QR code that allows authorized personnel to view the link associated with the QR code, but prevents any unauthorized views.

In an embodiment, a note is a shared note between one or more users and a QR code is used to link physical objects with the shared note. The shared note includes a chronology and history of related comments, replies, and links to objects and/or locations. For example, the shared note includes a chronological list of items, such as user comments and postings, with the latest item at the top of the list. It is noted that one or more of the items includes links with objects labeled with a QR code.

In another embodiment, a shared note is related to a physical object labeled with a QR code. The note includes enriched and contextual information related to the object and a list of items (e.g. comments and replies) shared to the community of users having access to the shared note. Preferably, the items are listed in chronological order.

Figure 13A:
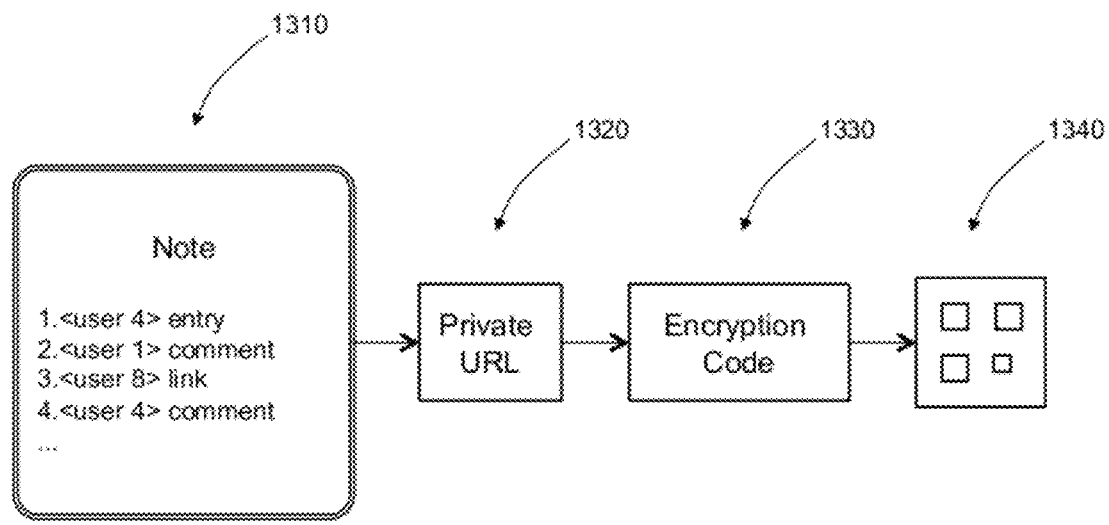
FIGS. 13A-B show an example of generating a note summary and private URL from a note, encrypting the note summary and private URL to form encoded text, generating a two-dimensional QR code from the encoded text, and accessing the note by decrypting the encoded text to identify the private URL according to the present invention.
Figure 13B:
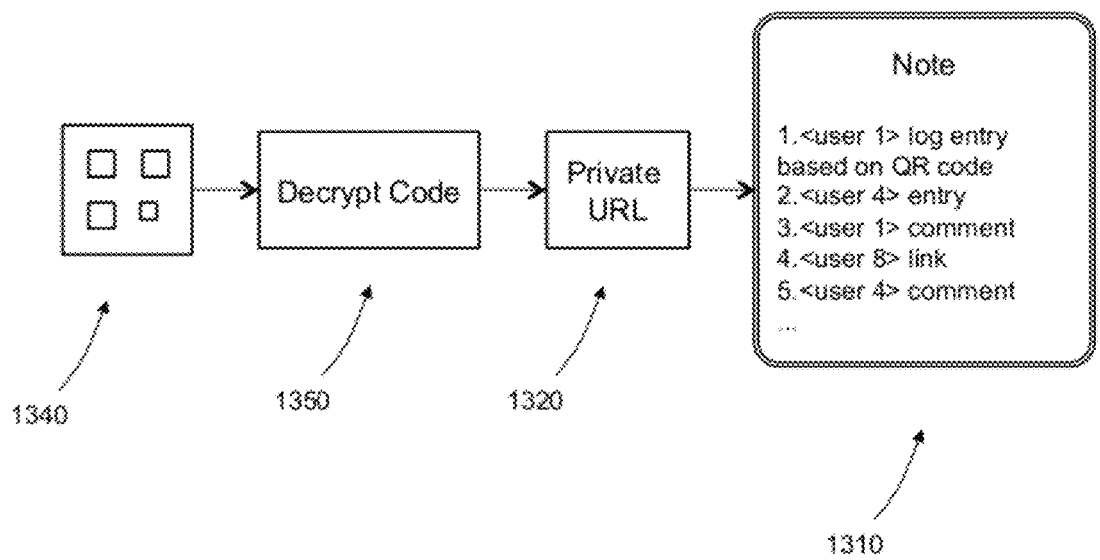

FIGS. 13A-B show a preferred embodiment of the present invention with automatic generation of a QR code from a shared note and accessing the note using the QR code. FIG. 13A shows a shared note 1310 with a list of user entries. The shared note 1310 can include a conversation between multiple users. Preferably, the comments and entries in the conversation are listed in chronological order with the most recent entry at the top. A private URL 1320 is associated with the note. The private URL 1320 provides a link to the entire conversation of the shared note 1310 and all of the content of the shared note 1310. An encryption code 1330 is generated to allow only authorized users from accessing the private URL 1320, and thereby the shared note 1310. A matrix code, such as a QR code 1340, is automatically generated to provide a link between the note and a physical object.

FIG. 13B shows an exemplary process of updating the shared note 1310 using the QR code. First, the QR code 1340 is viewed or imaged by a user, such as by placing the QR code 1340 proximate to a physical object of interest and imaging the QR code 1340 with a cell phone camera. If the user is an authorized user with the proper encryption key, the user can then decrypt the encoded text in the QR code 1350 to reveal the private URL 1320. The private URL 1320 provides a link to the shared note 1310 and the user can add an entry into the conversation in the shared note 1310. In the embodiment shown in FIG. 13B, the new user entry is placed at the top of the shared note 1310 as it is the most recent entry.

It is important to note that the QR code 1340 allows for a back and forth between one or more physical objects with a shared note 1310. In other words, the process of FIGS. 13A-B can be repeated any number of times, thereby physical objects labeled with the QR code 1340 become linked with the conversation of the shared note 1310.

The following is a list of example applications for semantic note taking with QR codes. It is noted that this list is not exhaustive and one of ordinary skill in the art will appreciate alternative applications or changes to these applications.

Figure 14:
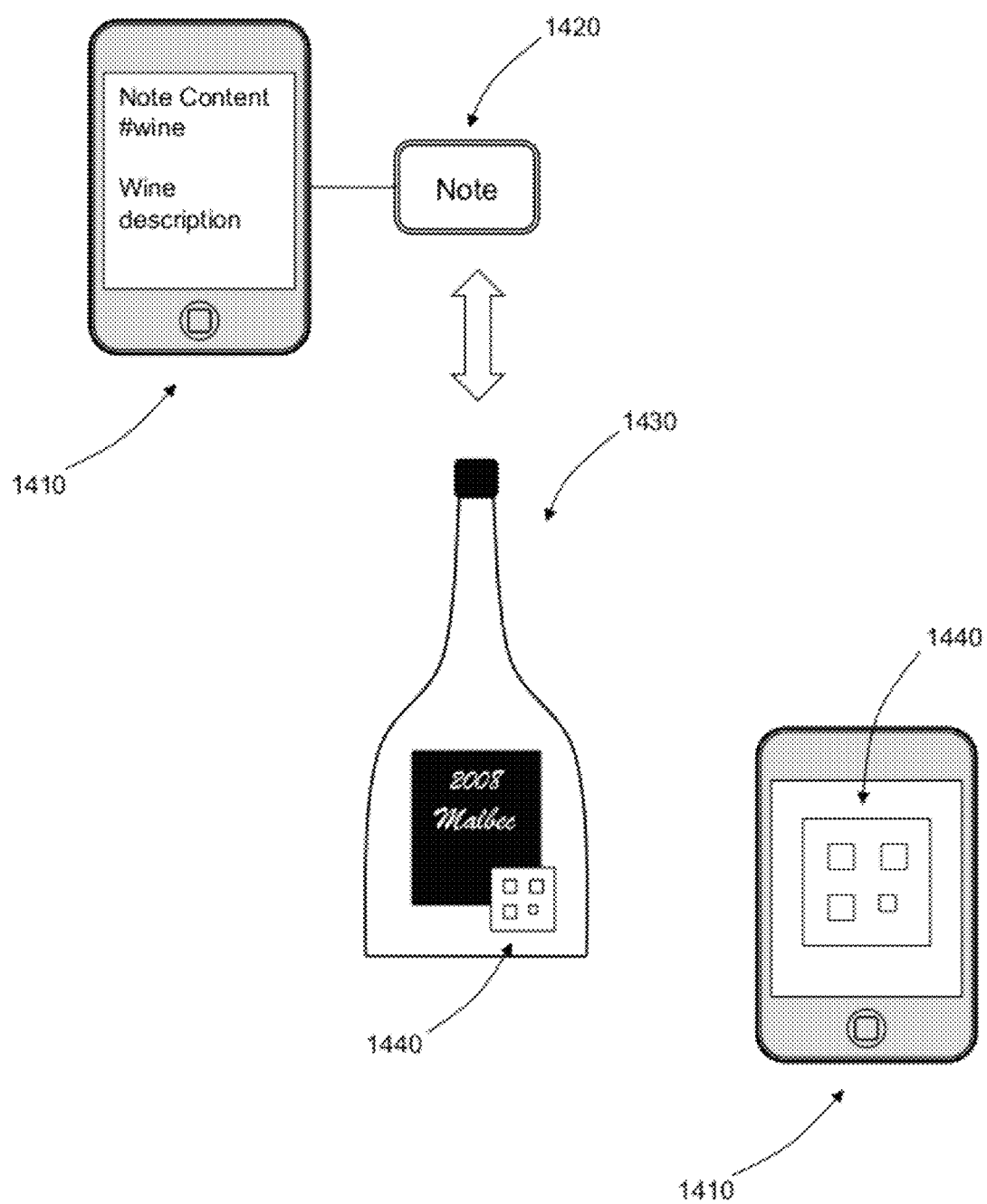
FIG. 14 shows an example of linking a semantic note with a physical object through a two-dimensional bar code according to the present invention.

Home or office inventory: QR codes and semantic notes can be used to inventory items in the home or office. For example, QR codes can be attached to wine bottles in a wine cellar and linked to the corresponding wine review notes. FIG. 14 shows an example of linking a physical object (e.g. wine bottle 1430) with a note 1420. A QR code 1440 is attached to the wine bottle 1430. The note can be written on a mobile phone 1410 and the QR code 1440 can be captured with the camera on the same mobile phone 1410 or a different phone.

Health, Diet, and Exercise: QR codes can be attached to medication to track use and refills. Food labels can rely on QR codes for a diet log. Exercise equipment can have QR codes to manage an exercise regimen.

Equipment service and repair: By affixing QR codes to equipment and linking them with notes, a usage and repair history of the equipment can be stored and monitored. The QR codes can be encrypted for equipment that is accessible in a public location.

Janitorial: QR codes can be used for documenting cleaning and inspections.

Location awareness: By placing QR codes at a particular location (e.g. a restaurant, place of interest, etc.), a user can track and remember where they had a certain experience that is described in a note.

Additional Embodiment(s)

Figure 15:
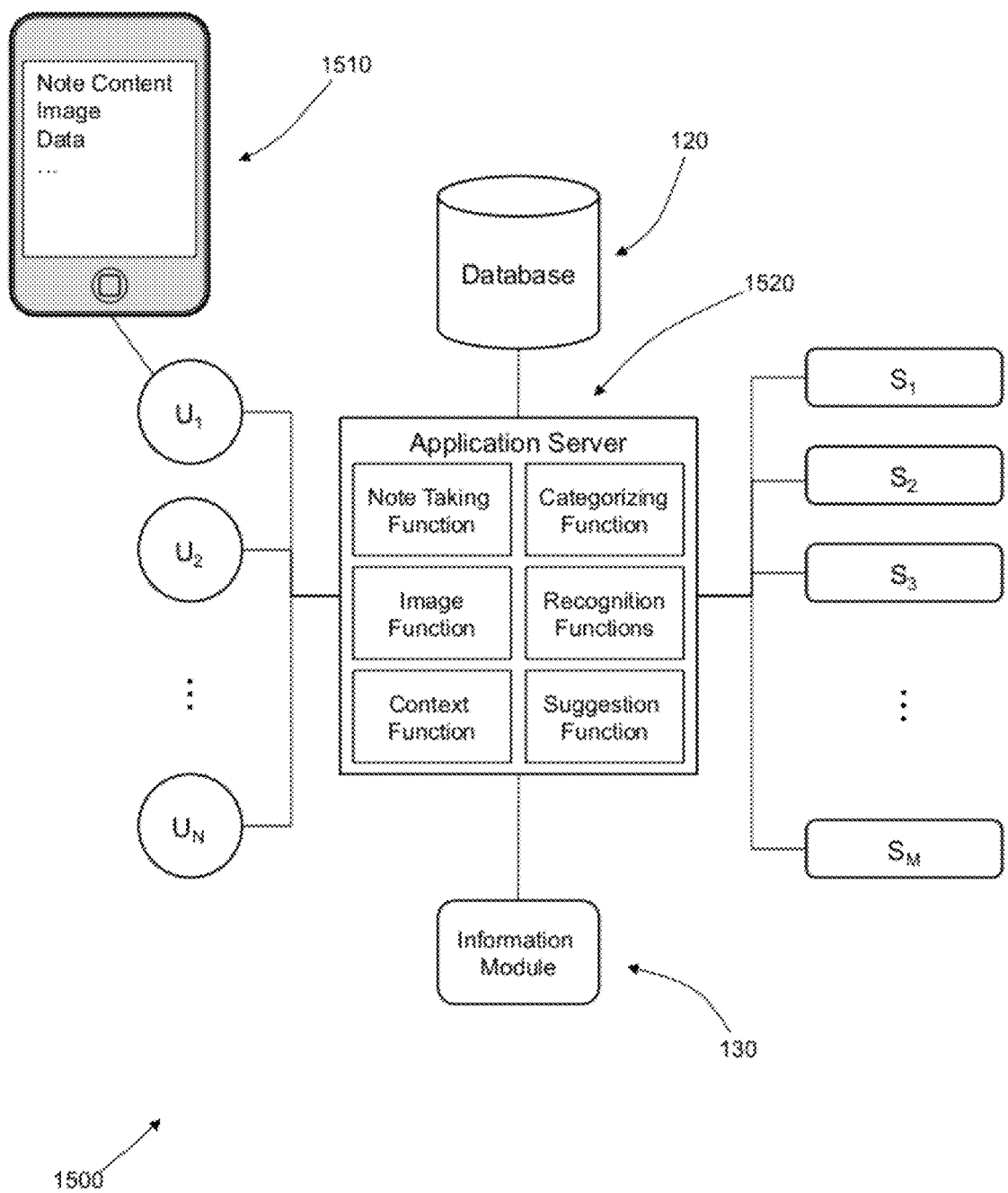
FIG. 15 shows an alternate example of a system according to the present invention.

FIGS. 15-24 show examples of one or more additional embodiments, which can be used in conjunction with one or more or the other teachings described herein or by itself as a method or system. FIG. 15 shows an embodiment of a system 1500 according to the present invention. The system 1500 includes an application server 1520 that is accessible by a plurality of users $U_1$-$U_N$ for, among other things, taking images of monitoring devices, recognizing imaged data into device data and quantifiable data, creating one or more notes, categorizing the imaged data, device data, quantifiable data, and notes, associating content or context traits, and binding the notes to one or more services $S_1$-$S_M$. The users $U_1$-$U_N$ connect to the application server 1520 through any device capable of being communicatively connected to a network, such as the Internet. The user devices can include a computer, a laptop, a personal digital assistant (PDA), a cell phone, a mobile device, or a smart phone. FIG. 15 shows user $U_1$ with a mobile phone 1510 that is connected to the application server 1520, such as through a wireless network.

Personal health monitoring devices lack standards for capturing and connecting data. Device manufacturers have been reluctant to add the cost of Bluetooth and other connectivity options to commoditized devices. The data from weight scales, blood pressure, thermometers, peak flow meters and many other devices ends up being lost because it is not captured electronically. Even when it is captured electronically, the data usually is sent to propriety systems tied to the device manufacturer.

Electrically coupling medical devices to electronic devices triggers a regulatory burden as now the networking device also is classified as a medical device subject to regulatory approval. What is needed in the art is a generalized technique for capturing and encoding electronic data from devices without any dependence on the device manufacturer and without electrically coupling the medical device to the network appliance. Embodiments of this invention advance the art in at least that direction.

The following description addresses different aspects of the invention. Further examples or additional teachings related to embodiments of this invention are described in U.S. patent application Ser. No. 12/924,094 filed Sep. 20, 2010 (Context-Aware Prompts and Alerts in a Note-Sharing System), U.S. patent application Ser. No. 12/802,740 filed Jun. 11, 2010 (Semantic Note Enriching System), U.S. patent application Ser. No. 12/381,594 filed Mar. 13, 2009 (Semantic Note Taking System), and U.S. patent application Ser. No. 12/322,046 filed Jan. 27, 2009 (Semantic Note Taking System), which are all hereby incorporated by reference for all that they teach.

In one exemplary embodiment, an image is captured of a monitoring device display using for example a Smartphone. The image is matched to a library of monitoring devices. As such, image recognition of the device is used to classifies or tag the data captured. OCR (Optical Character Recognition) of the device display output converts image into quantified data. The data captured from OCR is tagged and classified based on the device recognition.

Figure 16:
FIG. 16 shows an example of a monitoring device, a weight scale 1610, according to the present invention.
Figure 17:
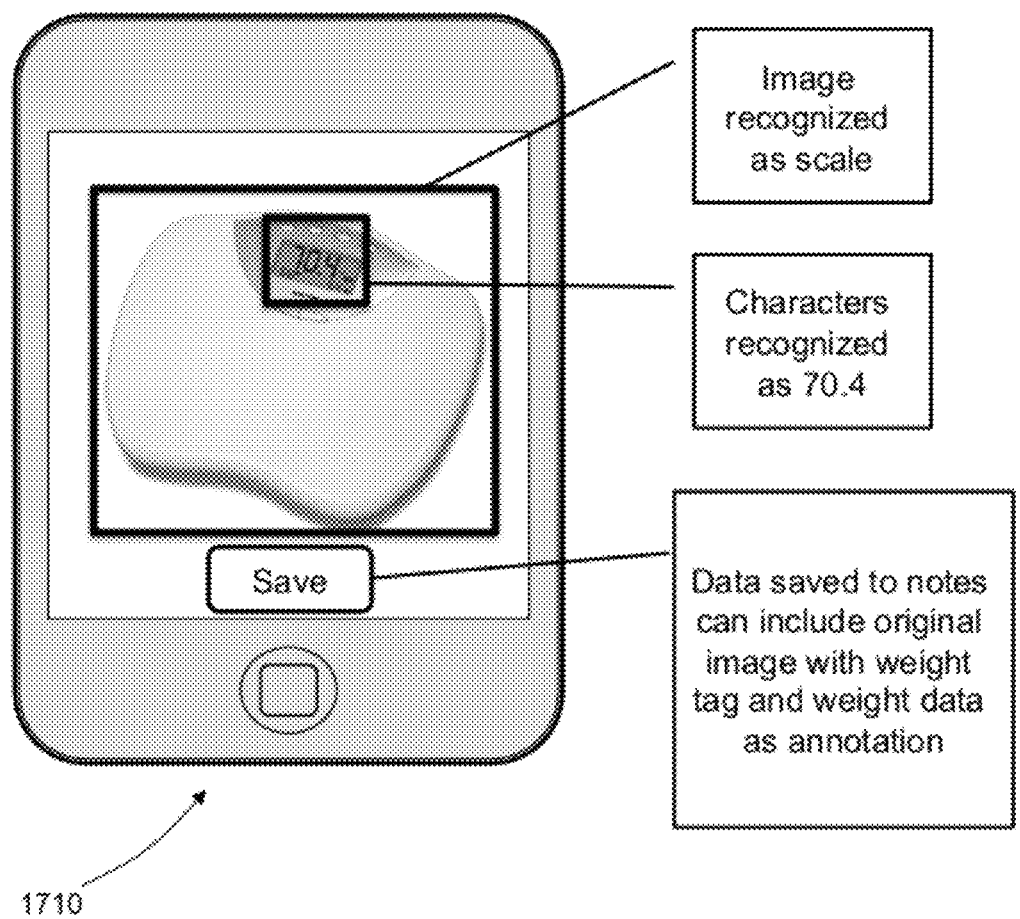
FIG. 17 shows an example a mobile device 1710 having an image of weight scale 1510 which is recognized by a recognition function according to the present invention. Further shown is an example where a text recognition function recognizes part of the image and converts it into quantified data or characters (70.4).

FIGS. 16-17 show an example of a weight monitoring device 1610. In this example, weight scale integration is accomplished with a mobile health monitoring system via image capture and recognition of text and the monitoring device on the user's mobile device 1710.

Figure 18:
FIG. 18 shows an example of a monitoring device, an exercise treadmill and content to the note 1810 according to the present invention.
Figure 19:
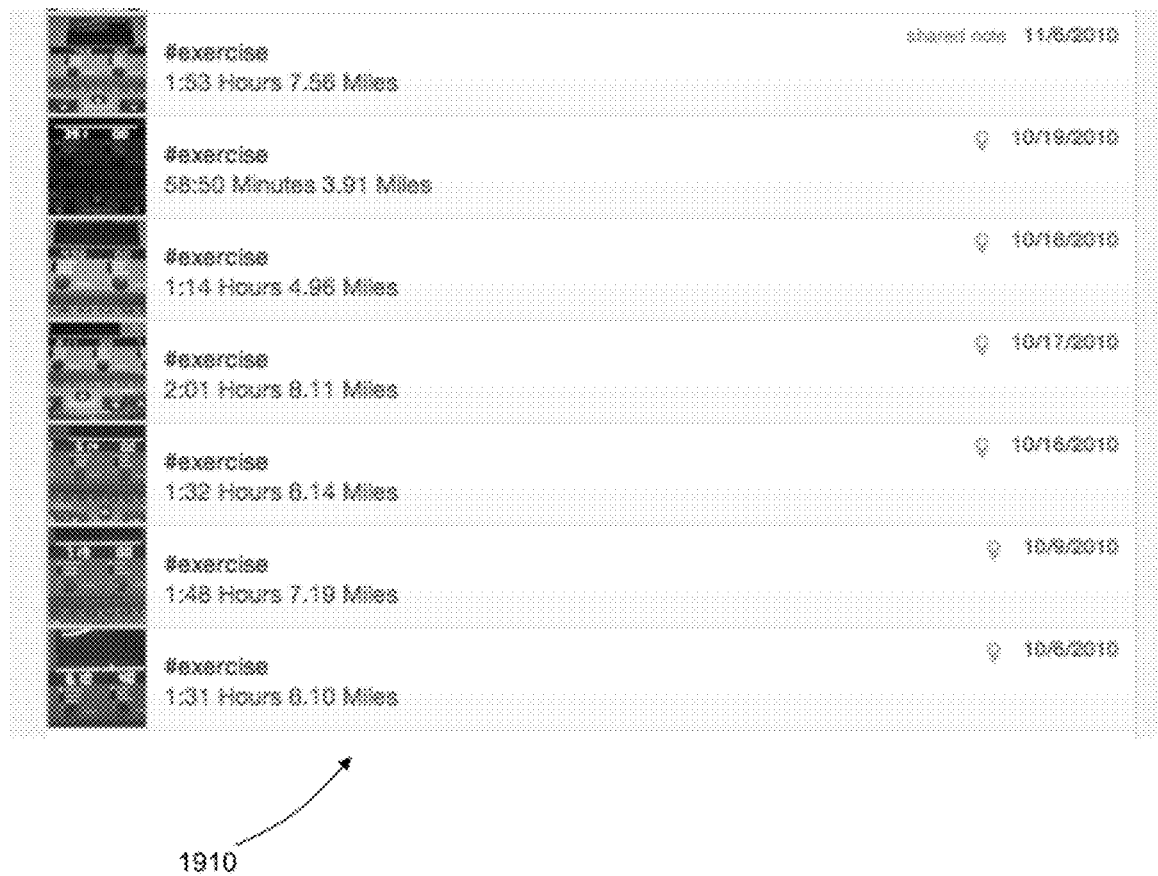
FIG. 19 shows an example of tracking data over time (1910) when using exercise treadmill 1810 according to the present invention.

FIGS. 18-19 show an example when using an exercise treadmill 1810. A photo note of the treadmill display after working out is displayed. Image recognition of treadmill automatically creates #exercise tag. OCR of image recognizes time and distance. Data is appended to the note as an annotation as shown in FIG. 18. Human readable content can be inserted into note. Location data also is captured and can be used to identify image or narrow the range of possibilities for image recognition. The original image can be retained for quality assurance and error correction.

FIG. 19 shows an example of tracking data over time for further analysis and visualization. Data can be saved on mobile device and in cloud in an #exercise stream. Data can also be shared with friends on a social network or published on feeds like Twitter. Data can be also shared with health records such as Microsoft Health Vault or Google Health via integration using an open API.

Figure 20:
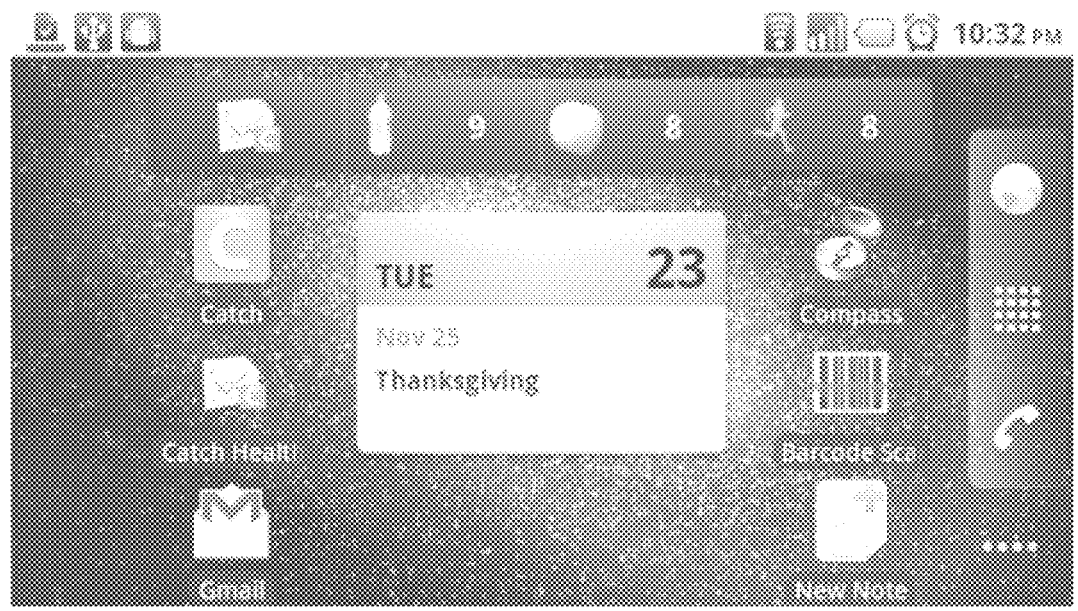
FIGS. 20-21 show examples of a health tracking system 2010 for which information over time can be displayed in graph 2110 according to the present invention.
Figure 21:
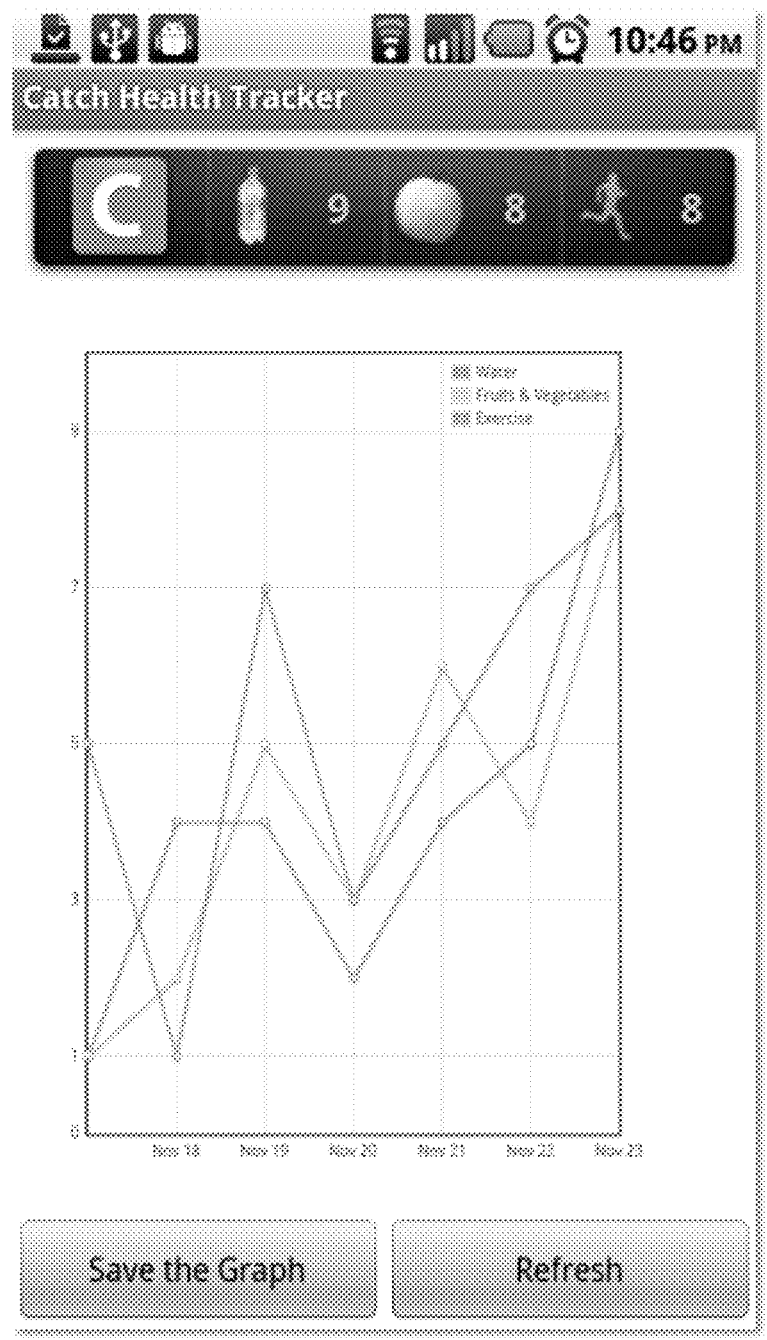

FIGS. 20-21 show examples of the so-called "Catch Health Tracker", which pertains to a one-click tracking of user entered parameters such as diet, exercise, symptoms or the like.

Figure 22:
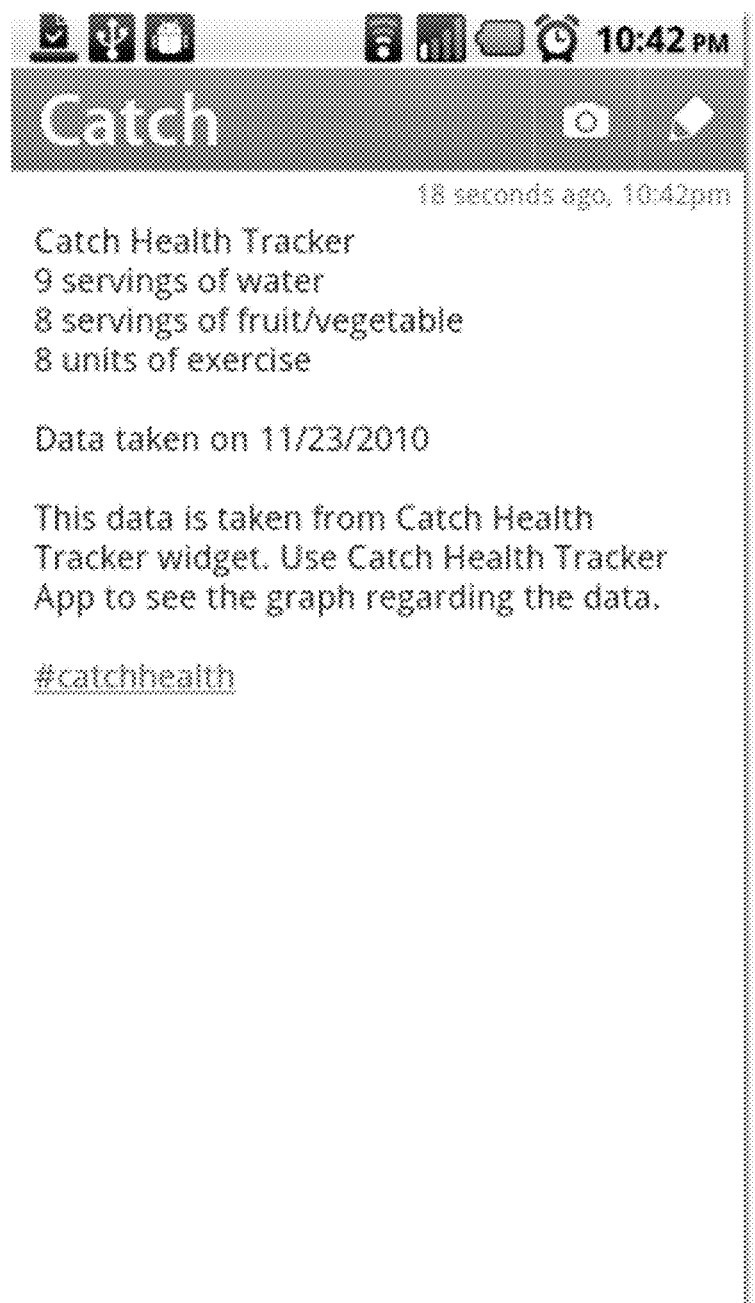
FIGS. 22-24 show examples of a health tracking system for which notes 2210, 2310, 2410 can be created according to the present invention.
Figure 23:
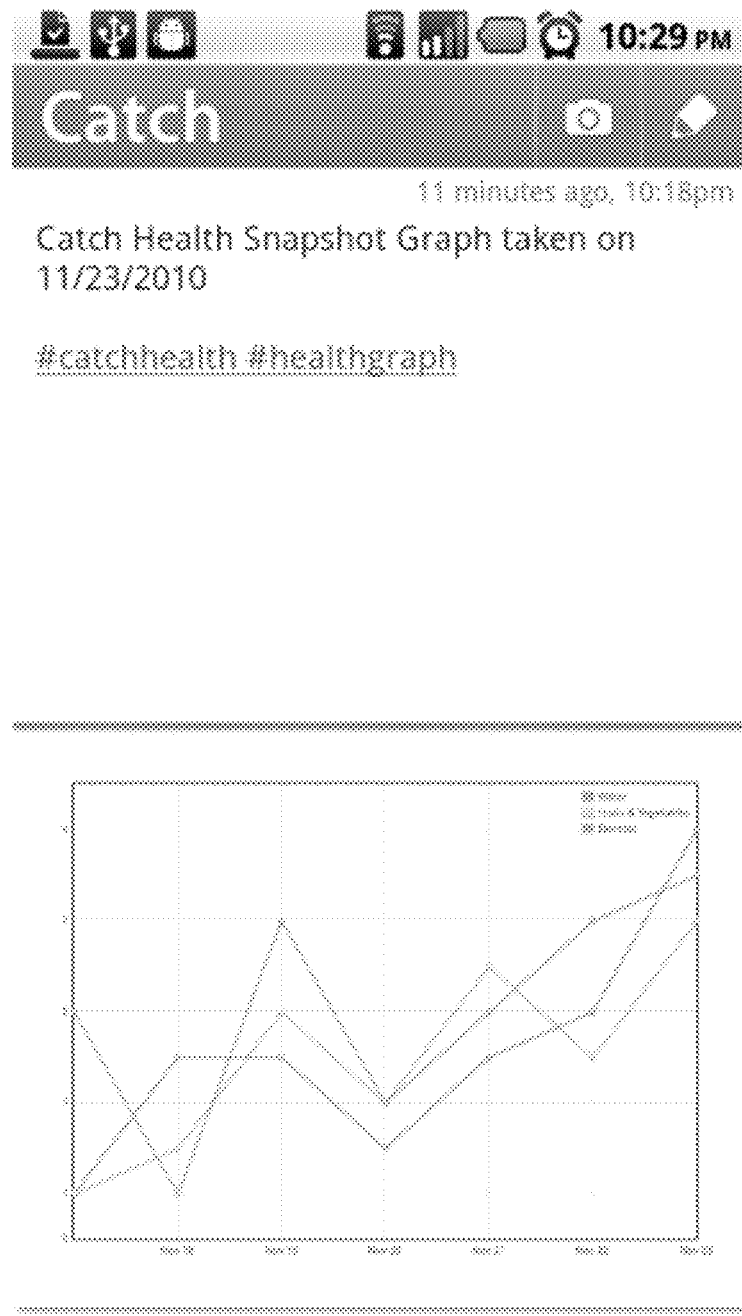
Figure 24:
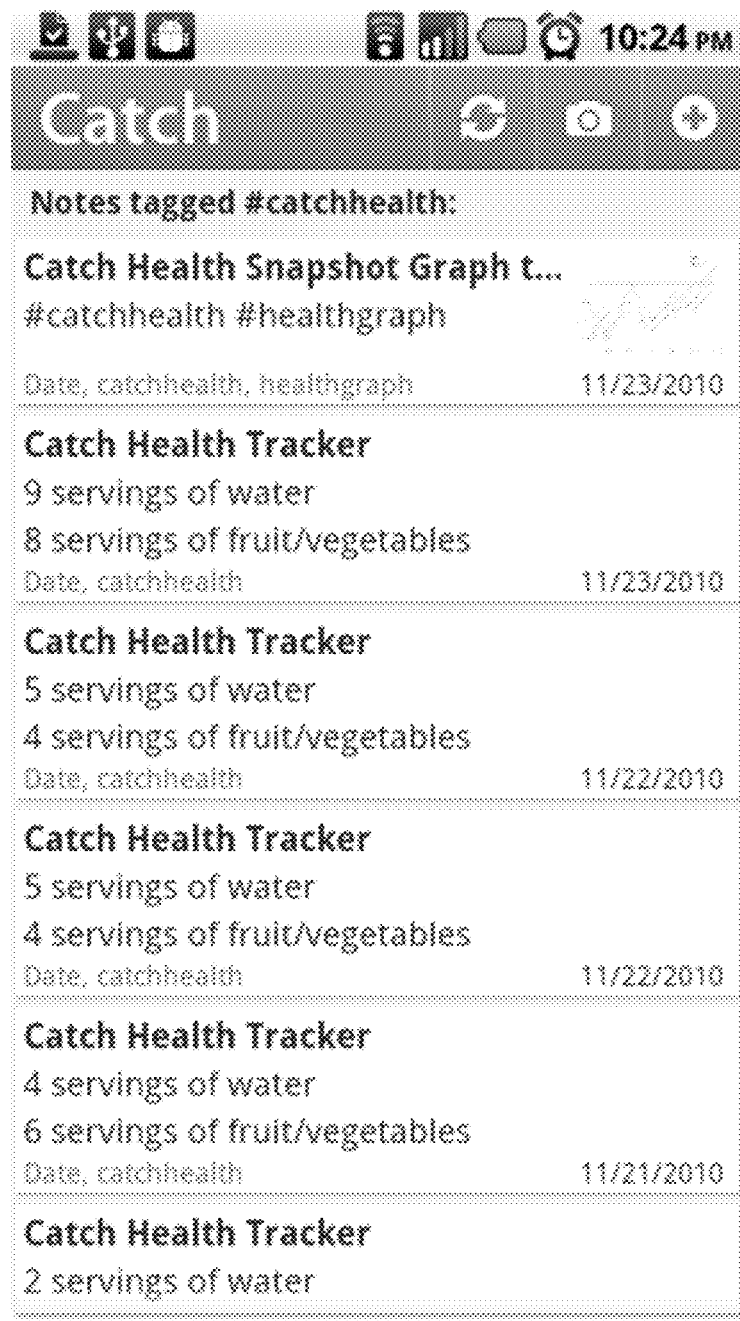

FIGS. 22-24 show examples of the "Catch Health Tracker" in which Health Notes can be generated by user input.

One-clicks can be generated from the home screen of a Smartphone to add quantified data such as diet, activity, mood, sleep, events, medication compliance, symptoms, adverse drug reactions. Users can specify which items to track manually and which items to track via image capture and analysis. One-clicks on camera can capture image, recognize device, extract quantified data and incorporate data in same health tracking stream. Users can train the system by identifying places as connected to specific devices, such as a treadmill in the garage or a weight scale in the bathroom. Examples provided herein can be expanded from health tracking to any device with instrumentation.

In another embodiment, near-field communication could be added to the device as a way to capture (i) tracker data or (ii) discover device type (http://en.wikipedia.org/wiki/Near_field_communication). In yet another embodiment, the ability to measure the orientation of the phone (pitch, roll, yaw) and use this data as context in deciding what kind of device it might be can be added. For example, information like "Is the phone facing down?" can be used. In this example of the phone facing down, it would be more likely to be a weight scale. In another example where the phone is tilted, it would be more likely to be the treadmill.

As one of ordinary skill in the art will appreciate, various changes, substitutions, and alterations could be made or otherwise implemented without departing from the principles of the present invention, e.g. notes can be communicated to any service capable of being connected to the network, and any network, such as a WAN or LAN, can be used in addition to or in replacement of the Internet. One or more examples of the invention can be embodied as computer software or computer-implemented methods operable on computer devices and/or systems, especially mobile devices or Smart phones.

One or more examples of the invention can also be embodied as a system integrating Smart phones, mobile devices, monitoring devices, computer servers for data storage and/or processing, data communication systems and/or the Internet. Accordingly, the scope of the invention should be determined by the following claims and their legal equivalents.

What is claimed is:

1. A method for collecting and recognizing information from a monitoring device, comprising:
    on a mobile computer device capturing an image of the monitoring device, wherein the image comprises at least: (i) monitored data tracked or acquired by the monitoring device, and (ii) a portion of the monitoring device sufficient to recognize the monitoring device;
    the mobile computer device automatically creating a note of the captured image on the mobile computer device, wherein the created note is stored;
    recognizing and converting the monitored data visible in the captured image into quantifiable numeric data and enriching the created note with the quantifiable numeric data;
    recognizing the monitoring device data and enriching the created note with the monitoring device data;
    enriching the created note by automatically associating the created note with one or more context traits, wherein the one or more context traits are automatically obtained by sensors of the mobile computer device; and
    visualizing on the mobile computing device the quantifiable numeric data of the created note.

2. The method as set forth in claim 1, wherein the note further comprises text, audio media, visual media, audio-visual media, recorded data, a weblink, a pointer to an information source, or any combination thereof.

3. The method as set forth in claim 1, wherein the monitoring device is a health monitoring device, a sport device, a training device or a medical device.

4. The method as set forth in claim 1, wherein the recognizing the monitoring device is recognizing in terms of type, kind, brand, model, or a combination thereof.

5. The method as set forth in claim 1, wherein the one or more context traits comprises a location, a place, a time, a source, a related note, a person, people, a group, a tag, an identity, sensor data, a media file, an audio file, physical data relating to the monitoring device or the mobile computer device, derived data, or any combination thereof.

6. The method as set forth in claim 1, further comprising suggesting one or more of services where the created note, the quantifiable numeric data, the recognized monitoring device, or one or more categories can be bound.

7. The method as set forth in claim 6, further comprising automatically binding the created note, the quantifiable numeric data, the recognized monitoring device, or one or more categories to one of the suggested services.

8. The method as set forth in claim 1, wherein the monitoring device recognition function uses a library of information related to monitoring devices for recognizing the imaged monitoring device.

9. The method as set forth in claim 1, further comprising categorizing with one or more categories: (i) the created note, (ii) the quantifiable numeric data, (iii) the recognized monitoring device, (iv) the context traits, or (v) a combination thereof.

10. A system for collecting and recognizing information from a monitoring device, comprising:
    on a mobile computer device capturing an image of the monitoring device, wherein the image comprises at least: (i) monitored data tracked or acquired by the monitoring device, and (ii) a portion of the monitoring device sufficient to recognize the monitoring device;
    the mobile computer device automatically creating a note of the captured image on the mobile computer device, wherein the created note is stored;
    recognizing and converting the monitored data visible in the captured image into quantifiable numeric data and enriching the created note with the quantifiable numeric data;
    recognizing the monitoring device data and enriching the created note with the monitoring device data;
    enriching the created note by automatically associating the created note with one or more context traits, wherein the one or more context traits are automatically obtained by sensors of the mobile computer device; and
    visualizing on the mobile computing device the quantifiable numeric data of the created note.

11. The system as set forth in claim 10, wherein the note further comprises text, audio media, visual media, audio-visual media, recorded data, a weblink, a pointer to an information source, or any combination thereof.

12. The system as set forth in claim 10, wherein the monitoring device is a health monitoring device, a sport device, a training device or a medical device.

13. The system as set forth in claim 10, wherein the recognizing the monitoring device is recognizing in terms of type, kind, brand, model, or a combination thereof.

14. The system as set forth in claim 10, wherein the one or more context traits comprises a location, a place, a time, a source, a related note, a person, people, a group, a tag, an identity, sensor data, a media file, an audio file, physical data relating to the monitoring device or the mobile computer device, derived data, or any combination thereof.

15. The system as set forth in claim 10, further comprising suggesting one or more of services where the created note, the quantifiable numeric data, the recognized monitoring device, or one or more categories can be bound.

16. The system as set forth in claim 15, further comprising automatically binding the created note, the quantifiable numeric data, the recognized monitoring device, or one or more categories to one of the suggested services.

17. The system as set forth in claim 10, wherein the monitoring device recognition function uses a library of information related to monitoring devices for recognizing the imaged monitoring device.

18. The method as set forth in claim 10, further comprising categorizing with one or more categories: (i) the created note, (ii) the quantifiable numeric data, (iii) the recognized monitoring device, (iv) the context traits, or (v) a combination thereof.

19. A non-transitory computer-readable storage medium having instructions for causing a mobile computer device to execute a method for collecting and recognizing information from a monitoring device, comprising:
    on the mobile computer device capturing an image of the monitoring device, wherein the image comprises at least: (i) monitored data tracked or acquired by the monitoring device, and (ii) a portion of the monitoring device sufficient to recognize the monitoring device;
    the mobile computer device automatically creating a note of the captured image on the mobile computer device, wherein the created note is stored;
    recognizing and converting the monitored data visible in the captured image into quantifiable numeric data and enriching the created note with the quantifiable numeric data;

recognizing the monitoring device data and enriching the created note with the monitoring device data;

enriching the created note by automatically associating the created note with one or more context traits, wherein the one or more context traits are automatically obtained by sensors of the mobile computer device; and visualizing on the mobile computing device the quantifiable numeric data of the created note.

20. The non-transitory computer-readable storage medium as set forth in claim 19, wherein the note further comprises text, audio media, visual media, audio-visual media, recorded data, a weblink, a pointer to an information source, or any combination thereof.

21. The non-transitory computer-readable storage medium as set forth in claim 19, wherein the monitoring device is a health monitoring device, a sport device, a training device or a medical device.

22. The non-transitory computer-readable storage medium as set forth in claim 19, wherein the recognizing the monitoring device is recognizing in terms of type, kind, brand, model, or a combination thereof.

23. The non-transitory computer-readable storage medium as set forth in claim 19, wherein the one or more context traits comprises a location, a place, a time, a source, a related note, a person, people, a group, a tag, an identity, sensor data, a media file, an audio file, physical data relating to the monitoring device or the mobile computer device, derived data, or any combination thereof.

24. The non-transitory computer-readable storage medium as set forth in claim 19, further comprising suggesting one or more of services where the created note, the quantifiable numeric data, the recognized monitoring device, or one or more categories can be bound.

25. The non-transitory computer-readable storage medium as set forth in claim 24, further comprising automatically binding the created note, the quantifiable numeric data, the recognized monitoring device, or one or more categories to one of the suggested services.

26. The non-transitory computer-readable storage medium as set forth in claim 19, wherein the monitoring device recognition flinction uses a library of information related to monitoring devices for recognizing the imaged monitoring device.

27. The non-transitory computer-readable storage medium as set forth in claim 19, further comprising categorizing with one or more categories: (i) the created note, (ii) the quantifiable numeric data, (iii) the recognized monitoring device, (iv) the context traits, or (v) a combination thereof.

\* \* \* \* \*